(12) United States Patent
Chauvier et al.

(10) Patent No.: US 11,912,731 B2
(45) Date of Patent: Feb. 27, 2024

(54) USE OF SILYLATED FORMIATES AS HYDROSILANE EQUIVALENTS

(71) Applicant: Commissariat a l'Energie Atomique et aux Energies Alternatives, Paris (FR)

(72) Inventors: Clément Chauvier, Paris (FR); Thibault Cantat, Issy les Moulineaux (FR); Timothé Godou, Orsay (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 190 days.

(21) Appl. No.: 16/328,445

(22) PCT Filed: Aug. 7, 2017

(86) PCT No.: PCT/EP2017/069914
§ 371 (c)(1),
(2) Date: Feb. 26, 2019

(87) PCT Pub. No.: WO2018/041543
PCT Pub. Date: Mar. 8, 2018

(65) Prior Publication Data
US 2021/0292345 A1 Sep. 23, 2021

(30) Foreign Application Priority Data
Aug. 31, 2016 (FR) ..................................... 1658098

(51) Int. Cl.
*C07F 7/18* (2006.01)

(52) U.S. Cl.
CPC ..................................... *C07F 7/188* (2013.01)

(58) Field of Classification Search
CPC ............... C07F 7/188; C07F 7/04; C07F 7/08
See application file for complete search history.

(56) References Cited

U.S. PATENT DOCUMENTS 6,822,109 B2 * 11/2004 Xie ....................... C07F 7/1804
556/482

OTHER PUBLICATIONS

Dorwald F. A. Side Reactions in Organic Synthesis, 2005, Wiley: VCH, Weinheim p. IX of Preface p. 1-15.*
International Search Report issued in corresponding International Patent Application No. PCT/EP2017/069914 dated Nov. 30, 2017.
Oestreich, "Transfer Hydrosilylation," Angewandte Chemie International Edition, 55: 494-499 (2016).

* cited by examiner

*Primary Examiner* — Pancham Bakshi
(74) *Attorney, Agent, or Firm* — Morgan, Lewis & Bockius LLP

(57) ABSTRACT

The present invention relates to a method for preparing organic compounds of formula (I) by reaction between a silylated formiate of formula (II) and an organic compound in the presence of a catalyst and optionally of an additive. The invention also relates to use of the method for preparing organic compounds of formula (I) for the preparation of reagents for fine chemistry and for heavy chemistry, as well as in the production of vitamins, pharmaceutical products, adhesives, acrylic fibres, synthetic leathers, and pesticides.

16 Claims, 8 Drawing Sheets

1. Preparation of metallurgical-grade silicon by reduction of silica

2. Oxidation of metallurgical-grade silicon using chloromethane or HCl

3. Functionalisation of trichlorosilane

1. Synthesis of hydrosilanes by reduction and oxidation of silicon:

2. Redox-neutral synthesis of hydrosilanes

Hydrosilylation reaction primary amides:

secondary amides:

tertiary amides:

Hydrosilylation reaction and dehydrogenative coupling reaction primary amides:

secondary amides:

USE OF SILYLATED FORMIATES AS HYDROSILANE EQUIVALENTS

The present invention relates to a method for preparing organic compounds of formula (I) by reaction between a silylated formiate of formula (II) and an organic compound in the presence of a catalyst and optionally of an additive.

The invention also relates to use of the method for preparing organic compounds of formula (I) for the preparation of reagents for fine chemistry and for heavy chemistry, as well as in the production of vitamins, pharmaceutical products, adhesives, acrylic fibres, synthetic leathers, and pesticides.

Hydrosilanes, i.e. organic compounds having at least one silicon-hydrogen (Si—H) bond, are in widespread use in various industrial sectors for reducing, functionalising, and/or protecting unsaturated organic functions (C=C; C=O; C=N and other bonds) by hydrosilylation. This class of chemical reaction offers the advantage of inducing, in a single step, the transfer of a hydride (H−) and of silicon to an organic substrate. Advantageous use is made of this characteristic in particular in the silicone industry for synthesizing functionalised silanes, synthesising elastomers, or indeed for coupling silanes or siloxanes to organic polymers by hydrosilylation of alkene functions. In addition, hydrosilylation of C=O bonds is a common method in organic chemistry for reducing aldehydes and ketones.

However, the industrial methods that are currently used for preparing hydrosilanes are based exclusively on synthesis paths that consume large amounts of energy and that involve manipulating the degree of oxidation of the silicon (L. Rosch, P. John, R. Reitmeier, in *Ullmann's Encyclopedia of Industrial Chemistry*, Wiley-VCH Verlag GmbH & Co. KGaA, 2000). FIG. 1 thus shows the main paths of access to the "core types" of hydrosilanes and chlorosilanes, such as, for example, trichlorosilane ($HSiCl_3$) and various methylchlorosilanes ($Me_xSiCl_{4-x}$; $MeHSiCl_2$ or $Me_2HSiCl$). Preparing them starts with the same step, namely carbothermal reduction of silica $SiO_2$ or of silicates $SiO_4^{4-}$ (natural sources of silicon) at very high temperature (1900° C.). Carbothermal reduction of silica $SiO_2$ or of silicates $SiO_4^{4-}$ causes the formal degree of oxidation of silicon to go from +IV to 0 and this justifies the very harsh conditions used for synthesising metallurgical-grade silicon ($Si^{(0)}$). Such silicon is then re-oxidised in the presence of chloromethane ($CH_3Cl$) by using the Müller-Rochow process, i.e. the direct process, at temperatures approximately in the range 200° C. to 300° C. or by using hydrochloric acid (HCl) at 300° C. to give trichlorosilane. It thus appears that obtaining "core types" of silanes, from which all of the organic derivatives of silicon are obtained by functionalisation (step 3 of FIG. 1), is based on a reaction sequence that is energetically unfavourable due to the redox manipulation of the silicon as follows: $Si(+IV) \rightarrow Si(0) \rightarrow Si(+IV)$.

From the above, it is clear that the above-mentioned conventional process paths would be greatly improved by methods or processes that are neutral from the point of view of redox for silicon, whereby the degree of oxidation +IV of silicon is maintained, and that are not based on carbothermal reduction of silica, but rather that make it possible for access to the hydrosilanes from said silica. Research is currently in progress to that end, for accessing not only hydrosilanes but also chlorosilanes, and more specifically for accessing $SiCl_4$ directly from silica. Indeed, it has been known since the 1950s that silica $SiO_2$ can be functionalised directly in the presence of alcohol and of bases to give orthosilicates of formula $Si(OR)_4$ that are widely used in sol-gel chemistry (a) A. Boudin, G. Cerveau, C. Chuit, R. J. P. Corriu, C. Reye, *Organometallics* 1988, 7, 1165-1171; b) R. M. Laine, K. Y. Blohowiak, T. R. Robinson, M. L. Hoppe, P. Nardi, J. Kampf, J. Uhm, *Nature* 1991, 353, 642-644; c) L. N. Lewis, F. J. Schattenmann, T. M. Jordan, J. C. Carnahan, W. P. Flanagan, R. J. Wroczynski, J. P. Lemmon, J. M. Anostario, M. A. Othon, *Inorganic Chemistry* 2002, 41, 2608-2615). It has also been shown recently that such silicates (in particular $Si(OCH_3)_4$) can be converted with very good yields into tetrachlorosilane $SiCl_4$ in the presence of hydrochloric acid (J. M. Roberts, D. V. Eldred, D. E. Katsoulis, *Industrial & Engineering Chemistry Research* 2016, 55, 1813-1818). Like trichlorosilane $HSiCl_3$, tetrachlorosilane can then undergo one or more functionalisations with Grignard reagents to give specialty chlorosilanes ($R_xSiCl_{4-x}$). It is thus possible to obtain chlorosilanes from silica without using a costly reduction step.

However, forming a hydrosilane from a chlorosilane is also a step that is costly in terms of energy consumption because it is based on using hydrides of the main group, such as $LiAlH_4$ (H. Gilman, R. K. Ingham, A. G. Smith, *The Journal of Organic Chemistry* 1953, 18, 1743-1749). Such a hybrid of the main group is obtained through processes having high energy consumption, and most often at high temperature, from aluminium trichloride $AlCl_3$ and from alkaline hydride LiH, which is itself produced industrially by a reaction between molten metallic lithium and molecular hydrogen $H_2$ at high temperatures and at high pressures. In addition, the very high reactivity of $LiAlH_4$ in the presence of water and the generation of aluminium salts in stoichiometric quantities make it a poor candidate for large-scale use.

Therefore, no methods currently exist that are satisfactory from the points of view of energy and of the environment for preparing the hydrosilanes that are essential to hydrosilylation reactions. FIG. 2 thus summarises the above-mentioned problems, namely going via metallurgical-grade silicon (section 1), or the neutral alternative that requires use of $LiAlH_4$ (Section 2).

One solution to the problems encountered for preparing hydrosilanes can consist of replacing the hydrosilanes with "hydrosilane equivalent" compounds that are capable of transferring, in a single step, a hydride (H−) and silicon to a saturated or unsaturated organic compound, at least as efficiently as hydrosilanes, and that can be prepared simply, in non-polluting manner, and economically, in particular from the points of view of energy and of the environment.

Using hydrosilane equivalent compounds is particularly advantageous because:

a) it avoids redox manipulations on silicon to form the Si—H and Si—Cl bonds; and above all b) it avoids using hydrides such as $LiAlH_4$ for forming the Si—H bonds from Si—Cl bonds.

Hydrosilane equivalents, in particular silylated derivatives of cyclohexa-1,4-diene (1,4-CHDN), in transfer hydrosilylation reactions and in transfer dehydrogenative coupling reactions, have been reported.

1. Radical Transfer Hydrosilylation of Alkenes, of Alkynes, and of Carbonyls

Historically the term "transfer hydrosilylation" was used for the first time by Studer & coll, in the early 2000s in the context of research into replacing toxic tin hydrides such as tributyltin hydride $Bu_3SnH$, in radical chemistry (S. Amrein, A. Timmermann, A. Studer, *Organic Letters* 2001, 3, 2357-2360). More specifically, that research group was able to show that cyclohexa-1,4-dienes (1,4-CHDNs) substituted in position 2 with silyl groups made it possible to perform dehalogenation reactions, deoxygenation reactions or indeed radical cyclisation reactions that are typical of tin hydrides. During those studies, the research group also brought to light an unexpected process: in the presence of radical acceptors such as an alkene or an alkyne and of an initiator (e.g. AIBN, 2,2' Azobis(2-methylpropionitrile)), the products obtained by reaction with the silylated 1,4 CHDNs are radical hydrosilylation products. Having not used hydrosilane, the process is thus referred to as "transfer hydrosilylation". The advantage of this methodology lies in it making it possible to circumvent a problem that is well known in radical chemistry for hydrosilylation, namely the difficulty of activating the Si—H bond, the bond dissociation energy (BDE) of which is 90 kcal·mol$^{-1}$. The Si—H bond is replaced by the 1,4-CHDN group that has hydrogens that are easily activatable and that have bond dissociation energy or "BDE C—H" of 78 kcal·mol$^{-1}$ in position 2.

Radical transfer hydrosilylation was then explored with a large number of different substrates as shown in FIG. 3 (S. Amrein, A. Studer, *Helvetica Chimica Acta* 2002, 85, 3559-3574).

Moreover, transfer hydrosilylation has been combined with radical cyclisations (S. Amrein, A. Timmermann, A. Studer, *Organic Letters* 2001, 3, 2357-2360) and those reactions specifically make it possible to use 1,4-CHDN carrying unencumbered silylated groups such as trimethylsilyl (TMS) in 9.

Finally, it has been shown that non-aromatic aldehydes such as cyclohexanol (11) or indeed ketones, such as cyclohexanone can be reduced by 1,4-CHDNs under relatively harsh conditions.

2. Ionic Transfer Hydrosilylation of Alkenes, of Alkynes, of Carbonyls, and of Imines By analogy with the above-mentioned work, the Oestreich Group has recently developed ionic chemistry for hydrosilylation based on the same silylated 1,4-CHDNs. Unlike Studer & coll., the work of Oestreich & coll. is really focused on the capacity of 1,4-CHDNs to act as hydrosilane precursors, in particular gaseous ones, such as trimethylsilane (Me$_3$SiH) (A. Simonneau, M. Oestreich, *Angewandte Chemie Int. Ed.* 2013, 52, 11905-11907) or silane (SiH$_4$) (A. Simonneau, M. Oestreich, *Nature chemistry* 2015, 7, 816-822). This can be understood well from the mechanistic point of view because Oestreich's process involves release of hydrosilanes in situ in the reaction medium from silylated 1,4 CHDNs. This behaviour of silylated 1,4-CHDNs was not observed in the radical chemistry of Studer & coll. This aspect of Oestreich's chemistry, namely release of gaseous hydrosilanes from liquid or solid precursors was, in particular, the subject of International Patent Application WO 2015/036309.

In *Angewandte Chemie Int. Ed.* 2013, 52, 11905-11907, Oestreich & coll. have shown that various 1,4-CHDNs substituted with trimethylsilyl groups (13), triethylsilyl groups (14) or indeed triisopropylsilyl (15) are capable of releasing the corresponding hydrosilanes in the presence of a very strong Lewis acid catalyst, tris(pentafluorophenyl) borane (B(C$_6$F$_5$)$_3$ or BCF). The authors were thus able to show that 13, which is a liquid under standard conditions for temperature and pressure (STP), led to release of gaseous silane Me$_3$SiH and to release of benzene. The same experiment conducted with an alkene being added to the reaction medium, e.g. 1-methylcyclohexene 16, led to the hydrosilylation product 17 (FIG. 4). The precursor of triethylsilane, Et$_3$SiH (14) also made transfer hydrosilylation of alkenes possible, but the reactions were slower than with 13. The 1,4-CHDN 15 in which the silylated group is very encumbered could not transfer said group to an organic substrate, and only the release of silane in solution was observed.

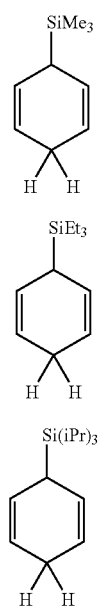

Further to alkenes, the Oestreich Group have also shown, in a recent publication, that non-terminal alkynes, such as diphenylacetylene (18), ketones (acetophenone 20) or indeed encumbered imines (22) could undergo transfer hydrosilylation with 13 as the hydrosilane donor (S. Keess, A. Simonneau, M. Oestreich, *Organometallics* 2015, 34, 790-799). Due to the coordinating properties of ketones or of imines (σ-complexation with the Lewis acid catalyst), the reactions with ketones or imines took place in benzene, at a higher temperature than for alkenes and alkynes (FIG. 5).

3. Transfer Dehydrogenative Coupling: Synthesis of Silylated Alcohol

The catalyst used in transfer hydrosilylation reactions, actually catalyses two successive reactions that are the release of hydrosilane from silylated 1,4-CHDNs and then direct hydrosilylation of unsaturated functions. Based on this mechanistic scheme, the Oestreich Group has thus been able to show that other reactions typical of hydrosilanes and catalysed by B(C$_6$F$_5$)$_3$ could be achieved in transfer from the silylated precursor 13 with the generation of a gas as the only reaction by-product.

By using 13 as a precursor of the gaseous hydrosilane Me$_3$SiH, in the presence of the boron-containing catalyst B(C$_6$F$_5$)$_3$, octanol (24) was silylated with yield of 89% and only benzene and hydrogen were obtained as by-products of the reaction (A. Simonneau, J. Friebel, M. Oestreich, *European Journal of Organic Chemistry* 2014, 2014, 2077-2083). However, in that protocol, the alcohols were actually added after the catalyst and the hydrosilane precursor in such a manner as to minimise the deactivation of the catalyst by (strong) complexation with alcohol and thereby make it possible to release hydrosilane before the alcohol was added (FIG. 6).

All of the above-mentioned hydrosilane transfer reactions are based on the use of silylated 1,4-CHDNs. Regardless of the degree of substitution thereof, 1,4-CHDNs are synthesised firstly by deprotonation of the 1,4-CHDNs in the bis-allylic position (position 2) by a strong base (pKa>40)

such as tert-butyllithium (t-BuLi) or sec-butyllithium (s-BuLi) in the presence of an additive such as TMEDA (tetramethylethylenediamine) at a low temperature (typically −78° C.). The organolithium reagent obtained in this step is then caused to react with a chlorosilane (e.g. chlorotrimethylsilane) to give the silylated 1,4-CHDNs such as 13. Other steps can be necessary if silylated 1,4-CHDNs that are substituted to greater extents are desired.

Moreover, all of the transfer reactions release aromatic compounds such as benzene when 13 is used, toluene (from 9; FIG. 3), or dimethoxytoluene (from 1; FIG. 3). In addition to the problem of toxicity that handling or manipulating these compounds can represent (e.g. benzene is a proven carcinogenic), recycling them as 1,4-CHDNs by breaking their aromaticity requires the use of reagents having very high energy contents. The Birch reaction is the method of choice for performing this type of transformation, but that reaction is based on the use of alkali metals such as sodium, in liquid ammonia at low temperature, and that poses problems both of safety (alkali metals are highly reactive, in particular with water), and of costs.

That state of the art shows that all of the currently known systems for promoting hydrosilane transfer reactions (in ionic or radical hydrosilylation or in dehydrogenative coupling) are based on silylated cyclohexa-1,4-dienes. Although silylated cyclohexa-1,4-dienes can be used in reactions with a wide variety of organic substrates (alkenes, alkynes, carbonyls, alcohols, etc.) and can thus serve as synthetic equivalents of hydrosilanes, preparing them from corresponding aromatic compounds requires processes that are costly in terms of energy consumption. Like the recycling mentioned in the preceding paragraph, the precursor 1,4-CHDNs of the silylated 1,4-CHDNs are obtained under the same harsh conditions from aromatic compounds coming from petrochemicals. Those silane transfer reactions are thus exclusively based on fossil resources that are limited and subject to economic fluctuations. Therefore, while the use of silylated 1,4-CHDNs does indeed make it possible to obviate the need to perform redox manipulations on silicon, since they are obtained from chlorosilanes, it merely shifts the problem of the use of reagents that consume large quantities of energy. Instead of using LiAlH$_4$, Studer and Oestreich based their approaches on cyclohexa-1,4-dienes that are of fossil origin and therefore that are also high-energy. These observations show that silylated 1,4-CHDNs cannot constitute an alternative to hydrosilanes, which are essential to hydrosilylation reactions, that is satisfactory and sustainable from the points of view of energy and of the environment.

There therefore exists a genuine need for hydrosilane equivalent compounds that are capable, in a single step, of transferring a hydride (H$^-$) and silicon to a saturated or unsaturated organic compound, at least as efficiently as hydrosilanes, and that that can be prepared simply and economically, in particular from the points of view of energy and of the environment.

There is also a genuine need for compounds as hydrosilane equivalents as defined above that can replace hydrosilanes in reactions:
for hydrosilylation of unsaturated organic functions such as alkenes, alkynes, nitriles, aldehydes, ketones, imines, carboxylic acids, amides, and esters; and
for dehydrogenative coupling, e.g. with an alcohol or an amine.

There is also a genuine need for compounds as defined above as hydrosilane equivalents, and that can replace hydrosilanes, said compounds:

having lower energy content than the high-energy reagents in the state of the art; and/or
being renewable and/or sustainable and/or more economical and/or less pollutant than the reagents in the state of the art; and/or
being inexpensive and easy to handle or manipulate; and/or
being capable of being prepared and used under milder conditions.

An object of the present invention is specifically to satisfy those needs by providing a method of preparing compounds of formula (I),

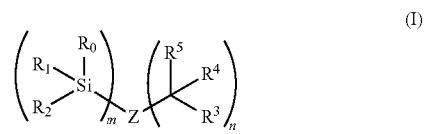

where:
independently from one another, $R_0$, $R_1$ and $R_2$ are chosen from the group formed by an alkoxy group, an aryloxy group, an alkyl group, a carboxyl group, an alkenyl group, an alkynyl group, an aryl group, a heteroaryl group, a heterocyclic group, a silyl group, and a siloxy group, said alkyl, alkenyl, alkynyl, aryl, heteroaryl, alkoxy, aryloxy, silyl, siloxy, or heterocyclic groups optionally being substituted, or
together with the silicon atom to which they are bonded, $R_0$ and $R_1$ form a silylated heterocycle that is optionally substituted and $R_2$ is as defined above;
n=0 or 1;
m=0 or 1;
when n=0 and m=1, Z is chosen from the group formed by —NR$_3$R$_4$ where:
independently from each other, $R_3$ and $R_4$ are chosen from the group formed by a hydrogen atom, an alkyl group, a halogenoalkyl group, an alkenyl group, an alkynyl group, a silyl group, an aryl group, a heteroaryl group, and a heterocyclic group, said alkyl, alkenyl, alkynyl, aryl, heteroaryl, silyl, or heterocyclic groups optionally being substituted; or
taken together with the nitrogen atom to which they are bonded, $R_3$ and $R_4$ form an optionally substituted heterocycle;
when n=m=1,
independently from one another, $R_3$, $R_4$, and $R_5$ are chosen from the group formed by a hydrogen atom, an alkyl group, a halogenoalkyl group, an alkenyl group, a cyclic alkenyl group, an alkynyl group, a silyl group, an aryl group, a heteroaryl group, and a heterocyclic group, said alkyl, alkenyl, alkynyl, aryl, heteroaryl, silyl, or heterocyclic groups optionally being substituted; or
together with the carbon atom to which they are bonded, $R_3$, $R_4$, and $R_5$ form an optionally substituted aryl; or
together with the carbon atom to which they are bonded, $R_3$ and $R_4$ form an optionally substituted cyclic alkyl and $R_5$ is as defined above; or
together with the carbon atom to which they are bonded, $R_3$ and $R_4$ form an optionally substituted cyclic alkenyl and $R_5$ is as defined above; or
together with the carbon atom to which they are bonded, $R_3$, $R_4$ and $R_5$ form a cyclic alkenyl; and Z is chosen from the group formed by:
X or Y as defined below,
together with the carbon atom to which they are bonded, Z and $R_5$ form a

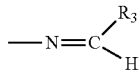

group, where $R_3$ is as defined above; or
together with the carbon atom to which they are bonded, Z and $R_5$ form a

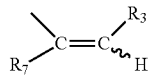

group, where $R_7$ is chosen from the group formed by a hydrogen atom, an alkyl group or an aryl group, said alkyl and aryl groups optionally being substituted, and $R_3$ being as defined above;
when n=1 and m=0, Z is chosen from the group formed by —$NR_9R_{10}$ where:
independently from each other, $R_9$ and $R_{10}$ represent a hydrogen atom, an alkyl group, an alkenyl group, an alkynyl group, an aryl group, a heteroaryl group, a heterocyclic group, and a silyl group, said alkyl, alkenyl, alkynyl, aryl, heteroaryl, heterocyclic, or silyl groups optionally being substituted; or
taken together with the nitrogen atom to which they are bonded, $R_9$ and $R_{10}$ form an optionally substituted heterocycle; and
$R_3$, $R_4$ and $R_5$ are as defined above;
said method being characterized in that a silylated formiate of formula (II)

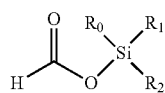

where $R_0$, $R_1$ and $R_2$ are as defined above, is caused to react with an organic compound of formula (III), (IV), (V), (VI), (VII), (VIII) or (IX)

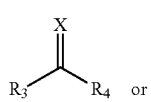

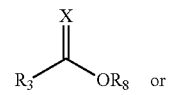

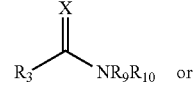

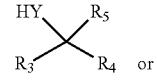

where:
$R_3$, $R_4$, $R_5$ $R_9$ and $R_{10}$ are as defined above;
$R_7$ is chosen from a group formed by a hydrogen atom, an alkyl group, or an aryl group, said alkyl and aryl groups optionally being substituted;
$R_8$ is chosen from the group formed by a hydrogen atom, an alkyl group, an alkenyl group, an alkynyl group, an aryl group, a heteroaryl group, and a heterocyclic group, said alkyl, alkenyl, alkynyl, aryl, heteroaryl, or heterocyclic groups optionally being substituted;
X is chosen from the group formed by:
an oxygen atom;
a $CR_aR_b$ group where, independently from each other, $R_a$ and $R_b$ represent a hydrogen atom, an alkyl group, an aryl group, a heteroaryl group, a silyl group, or a heterocyclic group, said alkyl, aryl, heteroaryl, silyl, or heterocyclic groups optionally being substituted; or
an $NR_6$ group where $R_6$ represents a hydrogen atom, an alkyl group, a silyl group, or an aryl group, said alkyl, silyl and aryl groups optionally being substituted; and
Y is chosen from a group formed by an oxygen atom or a sulphur atom;
in the presence of a catalyst and optionally of an additive.

Using silylated formiates of formula (II) to replace hydrosilanes in various chemical reactions known to be characteristic of hydrosilanes, such as, for example, hydrosilylation and/or dehydrogenative coupling, results directly in the disappearance of problems related to preparation of hydrosilanes, in particular redox manipulations on silicon for forming Si—H and Si—Cl bonds, and use of hydrides such as LiAlH$_4$ for forming the Si—H bonds from the Si—Cl bonds. Silylated formiates can be obtained by a redox-neutral chain of reactions (Si (+IV) maintained) from chlorosilanes. Synthesis of silylated formiates takes place in the absence of LiAlH$_4$ and very simply from chlorosilanes and from formic acid (HCO$_2$H), which is a renewable raw material, in the presence of a catalyst and optionally of a base as shown schematically in FIG. 7.

Unlike LiAlH$_4$, formic acid is formed under mild conditions by electro-reduction of CO$_2$ to 2e$^-$ (A. S. Agarwal, Y. Zhai, D. Hill, N. Sridhar, ChemSusChem 2011, 4, 1301-1310) or by catalytic hydrogenation of CO$_2$, which has the two consequences of reintegrating the CO$_2$ into an added value chain, and of greatly reducing the energy demand of the present method in comparison with methods using LiAlH$_4$.

Silylated formiates can replace hydrosilanes in reactions for hydrosilylation of unsaturated functions and/or in dehydrogenative couplings, e.g. between alcohol and a silane. These reactions with the various classes of amides are shown in FIG. 9. From the terminological point of view, reactions with silylated formiates may be considered as being "transfer hydrosilylation" or indeed "transfer dehydrogenative coupling" to show that the hydrosilylation products or coupling products are formed without formal use of hydrosilanes. This vocabulary is consistent with the distinction, well known to a person skilled in the art, between hydrogenation (use of hydrogen $H_2$) and transfer hydrogenation (use of hydrogen donors instead of $H_2$). In the method of the invention, silylated formiates can thus be considered to be "hydrosilane donors".

Thus, silylated formiates of formula (II) are used as hydrosilane equivalents in reactions for hydrosilylation of unsaturated organic functions and/or for dehydrogenative coupling. As indicated above, the silylated formiates may be obtained by reaction between formic acid, generated by hydrogenation or by electro-reduction to $2e^-$ of $CO_2$, and a chlorosilane prepared from silica by a reaction sequence that is redox-neutral for silicon.

The method of the invention thus enables the chemistry of hydrosilanes to be made more economical and less pollutant by substituting them with renewable equivalents without degrading the products typically accessible from hydrosilanes. Some advantages of the method of the invention are as follows:

- The present method is based on formic acid rather than on compounds having high energy contents such as aluminium hydrides, which are mentioned above as sources of hydrides. This results in considerably reducing the energy demand for performing reactions that are typical of hydrosilanes, and in integrating $CO_2$, which is ultimate waste from any chemical process, into an added value chain. Conversely, silylated 1,4-CHDNs are obtained under harsh conditions (see Birch reaction) from aromatic compounds coming from petrochemicals.
- Synthesising silylated formiates is of great operational simplicity since it involves mixing chlorosilane with formic acid, optionally in the presence of a base for trapping the hydrochloric acid (HCl) released by the reaction. Synthesis of silylated 1,4-CHDNs requires use of very strong bases, such as s-BuLi under cryogenic conditions (−78° C.), which involves taking particular precautions. In addition, since formic acid is a non-toxic liquid in a diluted solution (concentration less than 85% by mass in water), it is, de facto, a harmless reagent unlike aluminium hydrides or certain aromatic derivatives that are precursors of 1,4-CHDNs.
- The $CO_2$ released in the transfer reactions from silylated formiates is recyclable by the above-mentioned processes of electro-reduction or of hydrogenation of $CO_2$.
- In the ionic transfer reactions developed by Oestreich & coll., hydrosilanes are released into the reaction medium from silylated 1,4-CHDNs and from the catalyst $B(C_6F_5)_3$, even when the transfer does not take place. That can pose safety problems when the hydrosilanes in question are toxic and/or gaseous such as trimethylsilane ($Me_3SiH$). This behaviour is not observed with silylated formiates because the hydrosilanes are never released directly into the medium. It is then actually a hydrosilane transfer.
- In the transfer dehydrogenative coupling developed by Oestreich, the alcohols have to be added more than 30 minutes after the catalyst and the 1,4-CHDN in order to avoid deactivation of the catalyst. That approach adds experimental complexity that is not observed with the method of the invention that implements silylated formiates.
- In the transfer radical hydrosilylation developed by Studer & coll., the reaction is limited to a small number of carbonyls, e.g. the aromatic aldehydes that are of great industrial importance, in particular for perfumes, are inactive. With the method of the invention, a very large number of aldehydes, but also of ketones, of carboxylic acids, of esters, of amides, of imines, of alkenes, of alkynes, and of nitriles, can undergo transfer hydrosilylation with silylated formiates as shown in FIG. 8.

The method of the invention also makes it possible to achieve dehydrogenative coupling of compounds such as, for example, alcohols and amines as shown in FIG. 8.

Thus, in the method of the invention, the organic compounds (III) to (IX) can thus undergo transfer hydrosilylation or transfer dehydrogenative coupling. For hydrosilylation, the organic compounds have at least one unsaturation, such as, for example, aldehydes, ketones, imines, carboxylic acids, esters, amides, nitriles, alkenes, and alkynes. For dehydrogenative coupling, the organic compounds have at least one O—H, N—H, or S—H bond, such as alcohols (primary, secondary, and tertiary alcohols), thiols (primary, secondary, and tertiary thiols) or amines (primary and secondary amines).

The method of the invention makes it possible to achieve hydrosilylation and/or dehydrogenative coupling of organic compounds with good or indeed excellent yields and very good selectivity. In certain cases, after the method of the invention has been implemented, and in addition to the desired product, the only by-product that is obtained is $CO_2$.

In the context of the present invention, the term "hydrosilylation" is used to mean addition of a hydrogenosilane function (Si—H) to an unsaturated organic compound.

"Dehydrogenative coupling" means forming a silicon-heteroatom bond (O, N or S) accompanied by release of molecular hydrogen $H_2$.

In the sense of the present invention, an "alkyl" group designates a carbon-containing radical that is linear, branched, or cyclic, saturated, and optionally substituted, and that contains 1 to 20 carbon atoms. By way of a saturated, linear, or branched alkyl, it is possible to mention, for example, the methyl, ethyl, propyl, butyl, pentyl, hexyl, heptyl, octyl, nonyl, decyl, undecyl, and dodecanyl radicals, and their branched isomers. The alkyl group may, for example, contain 1 to 12 carbon atoms. In the context of the invention, the cyclic alkyl group may be monocyclic or polycyclic and contain 3 to 20 carbon atoms. As cyclic alkyl, mention can be made of the cyclopropyl, cyclobutyl, cyclopentyl, cyclohexyl, cycloheptyl, cyclooctyl, bicyclo[2,1,1] hexyl, bicyclo[2,2,1] heptyl, and adamantyl radicals.

"Alkenyl" or "alkynyl" means an unsaturated carbon-containing radical that is unsaturated, linear, branched, or cyclic, and optionally substituted, said unsaturated carbon-containing radical containing 2 to 20 carbon atoms, and at least one double bond (alkenyl) and/or at least one triple bond (alkynyl). The alkenyl and alkynyl groups may, for example, contain 2 to 16 carbon atoms. By way of examples of such groups, mention can be made of the ethylenyl, propylenyl, butenyl, pentenyl, hexenyl, heptenyl, octenyl, acetylenyl, propynyl, butynyl, pentynyl, and hexynyl radicals, and their branched isomers. In the context of the invention, the cyclic alkenyl group may be monocyclic or polycyclic and contain 3 to 20 carbon atoms. As cyclic alkenyls, mention can be made, for example, of cyclopentenyl, cyclohexenyl, and 2,3,4,7,8,9,11,12,14,15,16,17-dodecahydro-1H-cyclopenta[a]phenanthrenyl.

The alkyl, alkenyl, and alkynyl groups may optionally be substituted with: one or more hydroxyl groups; one or more alkyl groups; one or more thioalkoxy groups; one or more carboxyl groups (—OC(O)$R_{14}$); one or more acyl groups (—C(O)$R_{13}$); one or more aryloxy groups; one or more aryl groups; one or more thioaryloxy groups; one or more siloxy groups; one or more halogen atoms chosen from among fluorine, chlorine, bromine, and iodine atoms; one or more nitro groups (—$NO_2$); or one or more nitrile groups (—CN); where the alkoxy, thioalkoxy, aryloxy, thioaryloxy, carboxyl, acyl, alkyl, and siloxy groups are as defined in the context of the present invention.

The term "aryl" has the general meaning of a cyclic aromatic substituent containing 6 to 20 carbon atoms, e.g. 6 to 10 carbon atoms. In the context of the invention, the aryl group may be monocyclic or polycyclic. By way of indication, mention can be made of the phenyl, benzyl, and naphthyl groups. The aryl group may optionally be substituted with: one or more hydroxyl groups; one or more amino groups; one or more alkoxy groups; one or more aryloxy groups; one or more thioaryloxy groups (—S-aryl); one or more siloxy groups; one or more halogen atoms chosen from among fluorine, chlorine, bromine, and iodine atoms; one or more nitro groups (—$NO_2$); one or more nitrile groups (—CN); one or more alkyl groups; one or more thioalkoxy groups (—S-alkyl); one or more carboxyl groups (—OC(O)$R_{14}$); one or more acyl groups (—C(O)$R_{13}$); or one or more aryloxy groups; where the alkoxy, thioalkoxy, aryloxy, thioaryloxy, carboxyl, acyl, alkyl, and siloxy groups are as defined in the context of the present invention.

The term "heteroaryl" has the general meaning of an aromatic substituent that is monocyclic or polycyclic and that contains 5 to 12 members including at least 2 carbon atoms, and at least one heteroatom chosen from among nitrogen, oxygen, boron, silicon, phosphorus, or sulphur. The heteroaryl group may be monocyclic or polycyclic. By way of indication, mention may be made of the furyl, benzofuranyl, pyrrolyl, indolyl, isoindolyl, azaindolyl, thienyl, benzothienyl, pyridyl, quinolinyl, isoquinolyl, imidazolyl, benzimidazolyl, pyrazolyl, oxazolyl, isoxazolyl, benzoxazolyl, thiazolyl, benzothiazolyl, isothiazolyl, pyridazinyl, pyrimidilyl, pyrazinyl, triazinyl, cinnolinyl, phthalazinyl, and quinazolinyl groups. The heteroaryl group may optionally be substituted with: one or more hydroxyl groups; one or more alkoxy groups, one or more thioaryloxy groups; one or more siloxy groups; one or more halogen atoms chosen from among fluorine, chlorine, bromine, and iodine atoms; one or more nitro groups (—$NO_2$); one or more nitrile groups (—CN); one or more aryl groups; one or more alkyl groups; one or more thioalkoxy groups; one or more carboxyl groups; or one or more acyl groups; where the alkoxy, thioalkoxy, aryloxy, thioaryloxy, carboxyl (—OC(O)$R_{14}$), acyl (—C(O)$R_{13}$), alkyl, and siloxy groups are as defined in the context of the present invention.

The term "heterocycle" or "heterocyclic" has the general meaning of a monocyclic or polycyclic substituent that contains 5 to 10 members, that is saturated or unsaturated, and that contains 1 to 4 heteroatoms that are chosen independently from one another, from among nitrogen, oxygen, silicon, phosphorus, or sulphur. By way of indication, mention can be made of the substituents morpholinyl, piperidinyl, piperazinyl, pyrrolidinyl, imidazolidinyl, pyrazolidinyl, tetrahydrofuranyl, tetrahydropyranyl, thianyl, oxazolidinyl, isoxazolidinyl, thiazolidinyl, and isothiazolidinyl. The heterocycle group may optionally be substituted with: one or more alkyl groups; one or more alkoxy groups, one or more aryloxy groups; one or more thioalkoxy groups; one or more aryl groups; one or more thioaryloxy groups; one or more halogen atoms chosen from among fluorine, chlorine, bromine, and iodine atoms; one or more nitro groups (—$NO_2$); one or more nitrile groups (—CN); one or more siloxy groups; one or more carboxyl (—OC(O)$R_{14}$) groups; or one or more acyl groups (—C(O)$R_{13}$); where the alkoxy, thioalkoxy, aryloxy, thioaryloxy, carboxyl, acyl, alkyl, and siloxy groups are as defined in the context of the present invention.

In the meaning of the invention, the term "silylated heterocycle" is used to mean a monocyclic or polycyclic substituent that contains 5 to members, that is saturated or unsaturated, and that contains at least one silicon atom and optionally at least one other heteroatom chosen from among nitrogen, oxygen, and sulphur. Said silylated heterocycle may optionally be substituted with: one or more hydroxyl groups; one or more alkoxy groups, one or more aryloxy groups; one or more thioaryloxy groups; one or more siloxy groups; one or more halogen atoms chosen from among fluorine, chlorine, bromine, and iodine atoms; one or more nitro groups (—$NO_2$); one or more nitrile groups (—CN); one or more alkyl groups, one or more aryl groups; one or more thioalkoxy groups; one or more carboxyl groups; and or one or more acyl groups; where the alkoxy, thioalkoxy, aryloxy, thioaryloxy, carboxyl (—OC(O)$R_{14}$), acyl (—C(O)$R_{13}$), alkyl, and siloxy groups are as defined in the context of the present invention.

Among the silylated heterocycles, mention can be made, for example, of 1-methyl-1-silacyclo-3-pentene or 1-methyl-2,3,4,5-tetraphenyl-1-silacyclopentadiene, as defined by the following formulae.

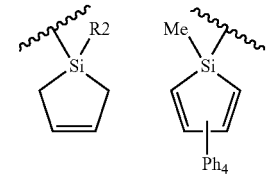

By way of example, mention can also be made of 2-methyl-1,2-oxasilinane, of 1-phenyl-1-silacyclohexane, of 1-sila-bicyclo[2.2.1]heptane and of 1-methyl-1-silacyclopentane that comply with the following formulae.

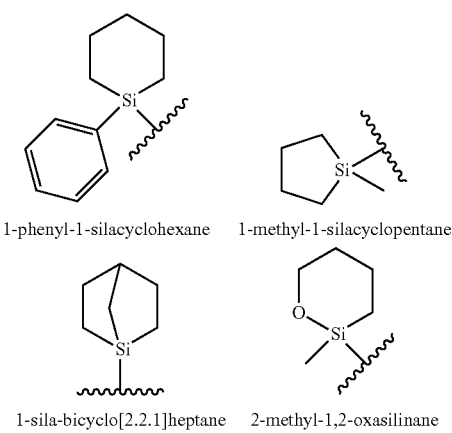

The term "alkoxy" means an alkyl group as defined above, bonded via an oxygen atom (—O-alkyl). By way of example of such a group, mention can be made of the methoxy, ethoxy, propoxy, isopropoxy, tert-butoxy or benzyloxy (PhCH$_2$—O—) groups.

The term "aryloxy" means an aryl group as defined above, bonded via an oxygen atom (—O-aryl). By way of indication of such a group, mention can be made of phenoxy (Ph-O—), of naphthalenoxy, or of anthracenoxy.

The term "thioalkoxy" means an alkyl group as defined above, bonded via a sulphur atom (—S-alkyl). By way of indication, mention can be made of thiomethoxy (—SCH$_3$), of thioethoxy (—SCH$_2$CH$_3$), and of thiobenzyloxy (PhCH$_2$S—).

The term "thioaryloxy" means an aryl group as defined above, bonded via a sulphur atom (—S-aryl). By way of indication, mention can be made of thiophenoxy (PhS—), of thionaphthalenoxy, or of thioanthracenoxy.

The "halogenoalkyl" group means an alkyl group as defined above and wherein one or more hydrogen atoms are substituted with one or more halogen atoms, said halogen atoms being chosen independently from one another from the group formed by fluorine, chlorine, bromine, and iodine atoms. By way of example of a halogenoalkyl group, mention can be made of —CF$_3$, —CCl$_3$, —CHCl$_2$, —CH$_2$Cl.

An "amino" group means a group of formula —NR$_9$R$_{10}$, where:
  independently from each other, R$_9$ and R$_{10}$ represent a hydrogen atom, an alkyl group, an alkenyl group, an alkynyl group, an aryl group, a heteroaryl group, a heterocyclic group, and a silyl group, where the alkyl, alkenyl, alkynyl, aryl, heteroaryl, heterocyclic, or silyl groups are optionally substituted as defined in the context of the present invention; or
  taken together with the nitrogen atom to which they are bonded, R$_9$ and R$_{10}$ form an optionally substituted heterocycle as defined in the context of the present invention.

By way of example, mention can be made of diethylamino (—NEt$_2$), diphenylamino (—NPh$_2$), of methylethylamino (—NMeEt), and of bis(trimethylsilyl)amino (—N(SiCH$_3$)$_2$).

"Halogen atom" means an atom chosen from among the atoms of fluorine, chlorine, bromine, and iodine.

The "carboxyl" group means a group of formula —OC(O)R$_{14}$ where:
  R$_{14}$ is chosen from among: a hydrogen atom, an alkyl group, an alkenyl group, an alkynyl group, an aryl group, a heteroaryl group, and a heterocyclic group, where the alkyl, alkenyl, alkynyl, aryl, heteroaryl, or heterocyclic groups are optionally substituted as defined in the context of the present invention. More particularly, R$_{14}$ is chosen from among a hydrogen atom, an alkyl group, and an aryl group, said alkyl and aryl groups optionally being substituted. By way of example, mention can be made of formiate (—OC(O)H), of acetate (—OC(O)CH$_3$), and of pivalate (—OC(O)tBu). Preferably, the carboxyl group is formiate (—OC(O)H).

The "acyl" group means a group of formula (—C(O)R$_{13}$) where:
  R$_{13}$ is chosen from among: a hydrogen atom, an alkyl group, an alkenyl group, an alkynyl group, an aryl group, a heteroaryl group, a heterocyclic group, a silyl group, a siloxy group, an amino group, and a halogen atom, where the alkyl, alkenyl, alkynyl, aryl, heteroaryl, heterocyclic, and amino groups are as defined in the context of the present invention.

By way of example, mention can be made of formyl (—C(O)H), acetyl (—C(O)CH$_3$), and pivaloyl (—OC(O)tBu).

A "silyl" group means a group of formula [—Si(Y')$_3$] where, independently from one another, each Y' is chosen from among one or more alkyl groups; one or more alkoxy groups; one or more aryloxy groups; one or more aryl groups; and one or more siloxy groups; where the alkyl, alkoxy, aryloxy, aryl, and siloxy groups are as defined in the context of the present invention. By way of example of such a group, mention can be made of trimethylsilyl (TMS), of triethylsilyl (TES), of tert-butyldiphenylsilyl (TBDPS), of tert-butyldimethylsilyl (TBS/TBDMS), of triisopropylsilyl (TIPS), of tri(trimethylsilyl)silyl or ((CH$_3$)$_3$Si)$_3$Si— (TTMS), and of tri(tert-butyl)silyl or ((CH$_3$)$_3$C)$_3$Si—.

A "siloxy" group means a silyl group, as defined above, bonded by an oxygen atom (—O—Si(Y')$_3$) where Y' is as defined above. By way of example of such a group, mention can be made of trimethylsiloxy —OSi(CH$_3$)$_3$, of triethylsiloxy —OSi(CH$_2$CH$_3$)$_3$, and of tert-butyldiphenylsiloxy —OSi(tBuPh$_2$)$_3$.

In a first embodiment of the invention, when n=0 and m=1,
  the organic compound is of formula (IX); and
  in the compound of formula (I), Z is chosen from the group formed by —NR$_3$R$_4$,
  where
  independently from each other, R$_3$ and R$_4$ are chosen from the group formed by a hydrogen atom, an alkyl group, a halogenoalkyl group, an alkenyl group, an alkynyl group, a silyl group, an aryl group, a heteroaryl group, and a heterocyclic group, said alkyl, alkenyl, alkynyl, aryl, heteroaryl, silyl, or heterocyclic groups optionally being substituted.

In this first embodiment, and independently from each other, R$_3$ and R$_4$ are chosen from the group formed by
  a hydrogen atom;
  an alkyl group containing 1 to 12 carbon atoms and chosen from the group formed by methyl, ethyl, propyl, butyl, pentyl, hexyl, heptyl, and the branched isomers thereof; or
  an aryl group containing 6 to 10 carbon atoms, e.g. phenyl, or benzyl, said alkyl and aryl groups optionally being substituted.

In this embodiment, Z is preferably —NHR$_3$ where R$_3$ represents heptyl and its branched isomers.

In a second embodiment of the invention, when n=0 and m=1,
  the organic compound is of formula (IX); and
  in the compound of formula (I), Z is chosen from the group formed by —NR$_3$R$_4$,
  where, taken together with the nitrogen atom to which they are bonded, R$_3$ and R$_4$ form an optionally substituted heterocycle.

In this second embodiment, taken together with the nitrogen atom to which they are bonded, R$_3$ and R$_4$ form a saturated heterocycle that contains 5 to 10 members and that is chosen from the group formed by morpholinyl, piperidinyl, piperazinyl, pyrrolidinyl, imidazolidinyl, imidazolinyl, pyrazolidinyl, tetrahydrofuranyl, tetrahydropyranyl, and thianyl.

In this embodiment, Z is preferably morpholinyl.

In a third embodiment of the invention, when n=m=1,
  the organic compound is of formula (III); and
  in the compound of formula (I), together with the carbon atom to which they are bonded, Z and R$_5$, form a

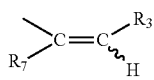

group, where:
R$_3$ is chosen from the group formed by a hydrogen atom, an alkyl group, a silyl group, an aryl group, a heteroaryl group, and a heterocyclic group, said alkyl, aryl, heteroaryl, silyl, or heterocyclic groups optionally being substituted;
R$_7$ is chosen from a group formed by a hydrogen atom, an alkyl group, or an aryl group, said alkyl and aryl groups optionally being substituted.

In this third embodiment,
independently from each other, R$_3$ and R$_7$ are chosen from the group formed by: a hydrogen atom; an alkyl group that contains 1 to 12 carbon atoms and that is chosen from the group formed by methyl, ethyl, propyl, butyl, pentyl, hexyl, heptyl, and the branched isomers thereof; or an aryl group that contains 6 to 10 carbon atoms and that is chosen from the group formed by phenyl, or benzyl, said alkyl and aryl groups optionally being substituted.

In a fourth embodiment of the invention, when n=m=1, the organic compound is of formula (IV); and
in the compound of formula (I), together with the carbon atom to which they are bonded, Z and R$_5$ form a

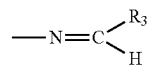

group,
where
R$_3$, is chosen from the group formed by a hydrogen atom, an alkyl group, a halogenoalkyl group, an alkenyl group, a cyclic alkenyl group, an alkynyl group, a silyl group, an aryl group, a heteroaryl group, and a heterocyclic group, said alkyl, alkenyl, alkynyl, aryl, heteroaryl, silyl, or heterocyclic groups optionally being substituted.

In this fourth embodiment,
R$_3$ is chosen from the group formed by: an alkyl group that contains 1 to 12 carbon atoms and that is chosen from the group formed by methyl, ethyl, propyl, butyl, pentyl, hexyl, heptyl, and the branched isomers thereof; or an aryl group that contains 6 to 10 carbon atoms and that is chosen from the group formed by phenyl, benzyl, or tolyl, said alkyl and aryl groups optionally being substituted.

In a fifth embodiment of the invention, when n=m=1, the organic compound is of formula (V); and
in the compound of formula (I), Z is X and X represents an oxygen atom, where
R$_5$ is chosen from the group formed by a hydrogen atom; and
independently from each other, R$_3$ and R$_4$ are chosen from the group formed by a hydrogen atom, an alkyl group, a halogenoalkyl group, an alkenyl group, a cyclic alkenyl group, an alkynyl group, an aryl group, a heteroaryl group, and a heterocyclic group, said alkyl, alkenyl, alkynyl, aryl, heteroaryl, or heterocyclic groups optionally being substituted.

In this fifth embodiment of the invention,
R$_5$ is chosen from the group formed by a hydrogen atom; and
independently from each other, R$_3$ and R$_4$, are chosen from the group formed by:
a hydrogen atom;
an alkyl group that contains 1 to 12 carbon atoms and that is chosen from the group formed by methyl, ethyl, propyl, butyl, pentyl, hexyl, heptyl, and the branched isomers thereof;
a halogenoalkyl group chosen from the group formed by —CF$_3$, —CCl$_3$, —CHCl$_2$, —CH$_2$Cl;
an alkenyl group that contains 2 to 16 carbon atoms and that is chosen from the group formed by ethylenyl, propylenyl, butenyl, pentenyl, hexenyl, and heptenyl;
a cyclic alkenyl group that contains 2 to 16 carbon atoms and that is chosen from the group formed by cyclopentenyl or cyclohexenyl;
an aryl group that contains 6 to 10 carbon atoms and that is chosen from the group formed by phenyl, naphthyl, benzyl, and tolyl; and
a heteroaryl group that contains 5 to 12 members including at least 2 carbon atoms and at least one heteroatom chosen from nitrogen, oxygen, and sulphur, the heteroaryl group being chosen from the group formed by furyl, thienyl, pyrrolyl, and pyridyl;
said alkyl, alkenyl, cyclic alkenyl, aryl, and heteroaryl groups optionally being substituted.

In this embodiment, preferably:
R$_5$ is chosen from the group formed by a hydrogen atom; and
independently from each other, R$_3$ and R$_4$, are chosen from the group formed by:
a hydrogen atom;
an alkyl group chosen from the group formed by heptyl and the branched isomers thereof;
a halogenoalkyl group chosen from the group formed by —CF$_3$;
an alkenyl group chosen from the group formed by ethylenyl optionally substituted with one or two phenyl groups, or with one or two methyl groups;
a cyclic alkenyl group chosen from the group formed by cyclohexenyl;
an aryl group chosen from the group formed by phenyl that is optionally substituted with one or more chlorine or boron atoms, one or more methoxy groups, one or more thiomethoxy (—SCH$_3$) groups, one or more methyl or tert-butyl groups, one or more —C(O)CH$_3$ groups, one or more —OC(O)CH$_3$ groups, one or more nitrile groups, one or more nitro groups, and one or more dimethylamino groups; and
a heteroaryl group chosen from the group formed by furyl, thienyl, pyrrolyl, and pyridyl.

In a sixth embodiment of the invention, when n=m=1, the organic compound is of formula (V); and
in the compound of formula (I), Z is X and X represents an oxygen atom, where:
R$_5$ is chosen from the group formed by a hydrogen atom; and
together with the carbon atom to which they are bonded, R$_3$ and R$_4$ form a cyclic alkyl containing 3 to 20 carbon atoms, said cyclic alkyl optionally being substituted.

In this sixth embodiment,
R$_5$ is chosen from the group formed by a hydrogen atom; and together with the carbon atom to which they are bonded, $R_3$ and $R_4$ form a cyclic alkyl chosen from the group formed by cyclopropyl, cyclobutyl, cyclopentyl, cyclohexyl, cycloheptyl, cyclooctyl, bicyclo[2,1,1] hexyl, bicyclo[2,2,1] heptyl, and adamantyl, said cyclic alkyl optionally being substituted.

In a seventh embodiment of the invention, when n=m=1, the organic compound is of formula (V); and in the compound of formula (I), Z is X and X represents a $CR_aR_b$ group, where:
independently from each other, $R_a$ and $R_b$ represent a hydrogen atom, an alkyl group, an aryl group, a heteroaryl group, a silyl group, or a heterocyclic group, said alkyl, aryl, heteroaryl, silyl, or heterocyclic groups optionally being substituted; and
$R_5$ is chosen from the group formed by a hydrogen atom; and
independently from each other, $R_3$ and $R_4$, are chosen from the group formed by a hydrogen atom, an alkyl group, an aryl group, a heteroaryl group, a silyl group, and a heterocyclic group, said alkyl, aryl, heteroaryl, silyl, or heterocyclic groups optionally being substituted.

In this seventh embodiment,
independently from each other, $R_a$ and $R_b$ represent:
a hydrogen atom;
an alkyl group that contains 1 to 12 carbon atoms and that is chosen from the group formed by methyl, ethyl, propyl, butyl, pentyl, hexyl, heptyl, and the branched isomers thereof;
an aryl group that contains 6 to 10 carbon atoms and that is chosen from the group formed by phenyl, and benzyl;
a heteroaryl group that contains 5 to 12 members including at least 2 carbon atoms and at least one heteroatom chosen from nitrogen, oxygen, and sulphur, the heteroaryl group being chosen from the group formed by furyl, thienyl, pyrrolyl, and pyridyl; or
a saturated heterocycle that contains 5 to 10 members and that is chosen from the group formed by morpholinyl, piperidinyl, piperazinyl, pyrrolidinyl, imidazolidinyl, imidazolinyl, pyrazolidinyl, tetrahydrofuranyl, tetrahydropyranyl, and thianyl;
said alkyl, aryl, heteroaryl or heterocyclic groups optionally being substituted.

In an eighth embodiment of the invention, when n=m=1, the organic compound is of formula (V); and in the compound of formula (I), Z is X and X represents a $CR_aR_b$ group, where:
independently from each other, $R_a$ and $R_b$ represent a hydrogen atom, an alkyl group, an aryl group, a heteroaryl group, a silyl group, or a heterocyclic group, said alkyl, aryl, heteroaryl, silyl, or heterocyclic groups optionally being substituted; and
$R_5$ is chosen from the group formed by a hydrogen atom; and
together with the carbon atom to which they are bonded, $R_3$ and $R_4$ form an optionally substituted cyclic alkyl; or
together with the carbon atom to which they are bonded, $R_3$ and $R_4$ form an optionally substituted cyclic alkenyl;
said cyclic alkyl and cyclic alkenyl groups optionally being substituted.

In this eighth embodiment,
independently from each other, $R_a$ and $R_b$ represent:
a hydrogen atom;
an alkyl group that contains 1 to 12 carbon atoms and that is chosen from the group formed by methyl, ethyl, propyl, butyl, pentyl, hexyl, heptyl, and the branched isomers thereof;
an aryl group that contains 6 to 10 carbon atoms and that is chosen from the group formed by phenyl, and benzyl;
a heteroaryl group that contains 5 to 12 members including at least 2 carbon atoms and at least one heteroatom chosen from nitrogen, oxygen, and sulphur, the heteroaryl group being chosen from the group formed by furyl, thienyl, pyrrolyl, and pyridyl; or
a saturated heterocycle that contains 5 to 10 members and that is chosen from the group formed by morpholinyl, piperidinyl, piperazinyl, pyrrolidinyl, imidazolidinyl, imidazolinyl, pyrazolidinyl, tetrahydrofuranyl, tetrahydropyranyl, and thianyl;
said alkyl, aryl, heteroaryl or heterocyclic groups optionally being substituted; and
together with the carbon atom to which they are bonded, $R_3$ and $R_4$ form a cyclic alkyl that contains 1 to 12 carbon atoms and that is chosen from the group formed by cyclopentyl, and cyclohexyl; or
together with the carbon atom to which they are bonded, $R_3$ and $R_4$ form a cyclic alkenyl chosen from the group formed by cyclopentenyl, and cyclohexenyl;
said cyclic alkyl and cyclic alkenyl groups optionally being substituted.

In a ninth embodiment of the invention, when n=m=1, the organic compound is of formula (V); and in the compound of formula (I), Z is X and X represents an $NR_6$ group, where:
$R_6$ represents a hydrogen atom, an alkyl group, a silyl group, or an aryl group, said alkyl, silyl and aryl groups optionally being substituted; and
$R_5$ is chosen from the group formed by a hydrogen atom; and
independently from each other, $R_3$ and $R_4$ are chosen from the group formed by a hydrogen atom, an alkyl group, an aryl group, and a silyl group, said alkyl, aryl, or silyl groups optionally being substituted.

In this ninth embodiment of the invention,
$R_6$ represents:
a hydrogen atom;
an alkyl group that contains 1 to 12 carbon atoms and that is chosen from the group formed by methyl, ethyl, propyl, butyl, pentyl, hexyl, heptyl, and the branched isomers thereof; or
an aryl group containing 6 to 10 carbon atoms, e.g. phenyl, or benzyl, said alkyl and aryl groups optionally being substituted; and
$R_5$ is chosen from the group formed by a hydrogen atom; and
independently from each other, $R_3$ and $R_4$ are chosen from the group formed by:
a hydrogen atom;
an alkyl group that contains 1 to 12 carbon atoms and that is chosen from the group formed by methyl, ethyl, propyl, butyl, pentyl, hexyl, heptyl, and the branched isomers thereof; and
an aryl group that contains 6 to 10 carbon atoms and that is chosen from the group formed by phenyl, and benzyl;
said alkyl and aryl groups optionally being substituted.

In this embodiment, preferably:

$R_6$ represents a methyl group;

$R_5$ is chosen from the group formed by a hydrogen atom; and independently from each other, $R_3$ and $R_4$ are chosen from the group formed by:

a hydrogen atom; and an aryl group that contains 6 to 10 carbon atoms and that is chosen from the group formed by phenyl, and benzyl;

said alkyl and aryl groups optionally being substituted.

In a tenth embodiment of the invention, when n=m=1, the organic compound is of formula (VI); and in the compound of formula (I), Z is X and X represents an oxygen atom, where:

$R_8$ is chosen from the group formed by a hydrogen atom, an alkyl group, an alkenyl group, an alkynyl group, an aryl group, a silyl group, a heteroaryl group, and a heterocyclic group, said alkyl, alkenyl, alkynyl, aryl, heteroaryl, or heterocyclic groups optionally being substituted; and $R_3$ is chosen from the group formed by a hydrogen atom, a hydroxyl group, an alkyl group, a halogenoalkyl group, an alkenyl group, an alkynyl group, an aryl group, a heteroaryl group, and a heterocyclic group, said alkyl, alkenyl, alkynyl, aryl, heteroaryl, or heterocyclic groups optionally being substituted; and independently from each other, $R_4$ and $R_5$ represent a hydrogen atom.

In this tenth embodiment of the invention, $R_8$ is chosen from the group formed by:

a hydrogen atom;

an alkyl group containing 1 to 12 carbon atoms and chosen from the group formed by methyl, ethyl, propyl, butyl, pentyl, hexyl, heptyl, and the branched isomers thereof; or an aryl group that contains 6 to 10 carbon atoms and that is chosen from the group formed by phenyl, and benzyl;

said alkyl and aryl groups optionally being substituted; and $R_3$ is chosen from the group formed by:

a hydrogen atom;

an alkyl group that contains 1 to 12 carbon atoms and that is chosen from the group formed by methyl, ethyl, propyl, butyl, pentyl, hexyl, heptyl, and the branched isomers thereof; and an aryl group that contains 6 to 10 carbon atoms and that is chosen from the group formed by phenyl, and benzyl;

said alkyl and aryl groups optionally being substituted; and independently from each other, $R_4$ and $R_5$ represent a hydrogen atom.

In an eleventh embodiment of the invention, when n=1 and m=0, the organic compound is of formula (VII), where X represents an oxygen atom; and in the compound of formula (I), Z is chosen from the group formed by —$NR_9R_{10}$, where:

independently from each other, $R_9$ and $R_{10}$ are chosen from the group formed by a hydrogen atom, an alkyl group, an alkenyl group, an alkynyl group, an aryl group, a heteroaryl group, a heterocyclic group, and a silyl group, with the alkyl, alkenyl, alkynyl, aryl, heteroaryl, heterocyclic, or silyl groups optionally being substituted; and $R_3$ is chosen from the group formed by a hydrogen atom, an alkyl group, a halogenoalkyl group, an alkenyl group, an alkynyl group, an aryl group, a heteroaryl group, and a heterocyclic group, said alkyl, alkenyl, alkynyl, aryl, heteroaryl, or heterocyclic groups optionally being substituted; and independently from each other, $R_4$ and $R_5$ represent a hydrogen atom.

In this eleventh embodiment of the invention, independently from each other, $R_9$ and $R_{10}$ are chosen from the group formed by:

a hydrogen atom;

an alkyl group that contains 1 to 12 carbon atoms and that is chosen from the group formed by methyl, ethyl, propyl, butyl, pentyl, hexyl, heptyl, and the branched isomers thereof; and an aryl group that contains 6 to 10 carbon atoms and that is chosen from the group formed by phenyl, and benzyl;

said alkyl and aryl groups optionally being substituted; and $R_3$ is chosen from the group formed by:

a hydrogen atom;

an alkyl group that contains 1 to 12 carbon atoms and that is chosen from the group formed by methyl, ethyl, propyl, butyl, pentyl, hexyl, heptyl, and the branched isomers thereof; and an aryl group that contains 6 to 10 carbon atoms and that is chosen from the group formed by phenyl, and benzyl;

said alkyl and aryl groups optionally being substituted; and independently from each other, $R_4$ and $R_5$ represent a hydrogen atom.

In a twelfth embodiment of the invention, when n=1 and m=0, the organic compound is of formula (VII), where X represents an oxygen atom; and in the compound of formula (I), Z is chosen from the group formed by —$NR_9R_{10}$, where:

taken together with the nitrogen atom to which they are bonded, $R_9$ and $R_{10}$ form an optionally substituted heterocycle; and $R_3$ is chosen from the group formed by a hydrogen atom, an alkyl group, a halogenoalkyl group, an alkenyl group, an alkynyl group, an aryl group, a heteroaryl group, and a heterocyclic group, said alkyl, alkenyl, alkynyl, aryl, heteroaryl, or heterocyclic groups optionally being substituted; and independently from each other, $R_4$ and $R_5$ represent a hydrogen atom.

In this twelfth embodiment of the invention, taken together with the nitrogen atom to which they are bonded, $R_9$ and $R_{10}$ form a saturated or unsaturated heterocycle that contains 5 to members, and that is chosen from the group formed by piperidinyl, piperazinyl, pyrrolidinyl, imidazolidinyl, and imidazolinyl, said heterocyclic group optionally being substituted; and $R_3$ is chosen from the group formed by:

a hydrogen atom;

an alkyl group that contains 1 to 12 carbon atoms and that is chosen from the group formed by methyl, ethyl, propyl, butyl, pentyl, hexyl, heptyl, and their branched isomers; and an aryl group that contains 6 to 10 carbon atoms and that is chosen from the group formed by phenyl, and benzyl;

said alkyl and aryl groups optionally being substituted; and independently from each other, $R_4$ and $R_5$ represent a hydrogen atom.

In a thirteenth embodiment, when n=m=1,
the organic compound is of formula (VIII); and
in the compound of formula (I), Z is Y, and Y represents
an oxygen atom, and, independently from each other, $R_3$, $R_4$, and $R_5$ are chosen from the group formed by:
a hydrogen atom;
an alkyl group containing 1 to 12 carbon atoms and chosen from the group formed by methyl, ethyl, propyl, butyl, pentyl, hexyl, heptyl, and the branched isomers thereof, said alkyl group optionally being substituted with:
one or more hydroxy groups;
one or more alkoxy groups in which the alkyl radical contains 1 to 12 carbon atoms and is chosen from the group formed by methoxy, ethoxy, propyloxy, butyloxy, pentyloxy, hexyloxy, heptyloxy, and the branched isomers thereof;
one or more alkenyl groups that contain 2 to 16 carbon atoms, and that are chosen from the group formed by ethylenyl propylenyl, butenyl, pentenyl, hexenyl, heptenyl, octenyl and their branched isomers, said alkenyl groups optionally being substituted with an alkyl group chosen from the group formed by ethyl, propyl, butyl, pentyl, and the branched isomers thereof;
one or more halogenoalkyl groups chosen from the group formed by —$CF_3$, —$CCl_3$, —$CHCl_2$, —$CClBrCF_3$;
one or more siloxy groups chosen from the group formed by trimethylsiloxy, triethylsiloxy, and butyldiphenylsiloxy; or
one or more aryl groups that contain 6 to 10 carbon atoms and that are chosen from the group formed by phenyl, and benzyl, optionally substituted with:
one or more halogen atoms chosen from among fluorine, chlorine, bromine, and iodine atoms;
one or more alkoxy groups chosen from the group formed by methoxy, ethoxy, propyloxy, butyloxy, pentyloxy, and the branched isomers thereof;
one or more alkyl groups chosen from the group formed by methyl, ethyl, propyl, butyl, pentyl, hexyl, heptyl, and the branched isomers thereof;
one or more —$C(O)R_{13}$ acyl groups, where represents an alkyl group that contains 1 to 12 carbon atoms and that is chosen from the group formed by methyl, ethyl, propyl, butyl, pentyl, hexyl, heptyl, and the branched isomers thereof, an aryl group chosen from the group formed by phenyl, and benzyl, an amino group chosen from the group formed by dimethylamino, and diethylamino, an alkoxy group chosen from the group formed by methoxy, and ethoxy, or an aryloxy group chosen from the group formed by benzyloxy, and phenoxy;
one or more —$OC(O)R_{14}$ carboxyl groups, where $R_{14}$ represents a hydrogen atom, an alkyl group chosen from the group formed by methyl, ethyl, propyl, butyl, pentyl, hexyl, heptyl, and the branched isomers thereof, or an aryl group chosen from the group formed by phenyl and benzyl;
one or more nitrile groups (—CN);
one or more nitro groups (—$NO_2$); or
one or more amino groups chosen from the group formed by —$NH_2$, —$NHCH_3$, —$N(CH_3)_2$, —$N(CH_2CH_3)_2$, and —$NH(CH_2CH_3)$;
an alkenyl group that contains 2 to 16 carbon atoms, and that is chosen from the group formed by ethylenyl propylenyl, butenyl, pentenyl, hexenyl, heptenyl, octenyl and the branched isomers thereof, said alkenyl groups optionally being substituted with:
one or more alkyl groups chosen from the group formed by methyl, ethyl, propyl, butyl, pentyl, and the branched isomers thereof;
one or more aryl groups chosen from the group formed by phenyl, and benzyl, optionally substituted with:
one or more halogen atoms chosen from among fluorine, chlorine, bromine, and iodine atoms;
one or more alkoxy groups chosen from the group formed by methoxy, ethoxy, propyloxy, butyloxy, pentyloxy, and the branched isomers thereof;
one or more alkyl groups chosen from the group formed by methyl, ethyl, propyl, butyl, pentyl, hexyl, heptyl, and the branched isomers thereof;
one or more thioalkoxy groups (—S-alkyl) with the alkyl radical being chosen from the group formed by methyl, ethyl, propyl, butyl, pentyl, hexyl, heptyl, and the branched isomers thereof;
one or more —$C(O)R_{13}$ acyl groups, where $R_{13}$ represents an alkyl group that contains 1 to 12 carbon atoms and that is chosen from the group formed by methyl, ethyl, propyl, butyl, pentyl, hexyl, heptyl, and the branched isomers thereof, an aryl group chosen from the group formed by phenyl, and benzyl, an amino group chosen from the group formed by dimethylamino, and diethylamino, an alkoxy group chosen from the group formed by methoxy, and ethoxy, or an aryloxy group chosen from the group formed by benzyloxy, and phenoxy;
one or more —$OC(O)R_{14}$ carboxyl groups, where $R_{14}$ represents a hydrogen atom, an alkyl group chosen from the group formed by methyl, ethyl, propyl, butyl, pentyl, hexyl, heptyl, and the branched isomers thereof, or an aryl group chosen from the group formed by phenyl and benzyl;
one or more nitrile groups (—CN);
one or more nitro groups (—$NO_2$); or
one or more amino groups chosen from the group formed by —$NH_2$, —$NHCH_3$, —$N(CH_3)_2$, —$N(CH_2CH_3)_2$, and —$NH(CH_2CH_3)$;
a —$C(O)R_{13}$ acyl group, where $R_{13}$ is an alkyl group that contains 1 to 12 carbon atoms and that is chosen from the group formed by methyl, ethyl, propyl, butyl, pentyl, hexyl, heptyl, and the branched isomers thereof;
an aryloxy group in which the aryl radical contains 6 to 10 carbon atoms and is chosen from the group formed by phenoxy and benzyloxy;
a halogenoalkyl group chosen from the group formed by —$CF_3$, —$CCl_3$, —$CHCl_2$, and —$CClBrCF_3$;
an aryl group that contains 6 to 10 carbon atoms and that is chosen from the group formed by phenyl, and benzyl, optionally substituted with:
one or more halogen atoms chosen from among fluorine, chlorine, bromine, and iodine atoms;
one or more alkoxy groups chosen from the group formed by methoxy, ethoxy, propyloxy, butyloxy, pentyloxy, and the branched isomers thereof;
one or more alkyl groups chosen from the group formed by methyl, ethyl, propyl, butyl, pentyl, hexyl, heptyl, and the branched isomers thereof;
one or more thioalcoxy groups (—S-alkyl) with the alkyl radical being chosen from the group formed by methyl, ethyl, propyl, butyl, pentyl, hexyl, heptyl, and the branched isomers thereof;

one or more —C(O)R$_{13}$ acyl groups, where R$_{13}$ represents an alkyl group that contains 1 to 12 carbon atoms and that is chosen from the group formed by methyl, ethyl, propyl, butyl, pentyl, hexyl, heptyl, and the branched isomers thereof;

one or more —OC(O)R$_{14}$ carboxyl groups, where R$_{14}$ represents a hydrogen atom, or an alkyl group chosen from the group formed by methyl, ethyl, propyl, butyl, pentyl, hexyl, heptyl, and the branched isomers thereof;

one or more nitrile groups (—CN);

one or more nitro groups (—NO$_2$); or one or more amino groups chosen from the group formed by —NH$_2$, —NHCH$_3$, —N(CH$_3$)$_2$, —N(CH$_2$CH$_3$)$_2$, and —NH(CH$_2$CH$_3$);

a heteroaryl group that contains 5 to 12 members including at least 2 carbon atoms and at least one heteroatom chosen from nitrogen, oxygen, and sulphur, said heteroaryl group being chosen from the group formed by furyl, thienyl, pyrrolyl, pyridyl, imidazolyl, and thiazolyl.

In this thirteenth embodiment of the invention, and independently from one another, R$_3$, R$_4$ and R$_5$ are chosen from the group formed by:

a hydrogen atom;

an alkyl group chosen from the group formed by methyl, and ethyl optionally substituted with a phenyl group, an n-propyl group, or an isopropyl group optionally substituted with a methoxy group, or a tert-butyl group optionally substituted with 1 to 3 groups chosen from trimethylsiloxy, n-butyl, n-pentyl, n-hexyl, and n-heptyl groups;

an alkenyl group chosen from the group formed by:

ethylenyl optionally substituted with:

one or more phenyl groups; or one or more methyl groups;

heptenyl optionally substituted with:

one or more methyl groups;

an aryl group chosen from the group formed by phenyl, and benzyl, optionally substituted with:

one or more halogen atoms chosen from among fluorine, chlorine, bromine, and iodine atoms;

one or more methoxy groups;

one or more —S—CH$_3$ groups;

one or more methyl or tert-butyl groups;

one or more —C(O)R$_{13}$ acyl groups, where R$_{13}$ represents a methyl group;

one or more —OC(O)R$_{14}$ carboxyl groups, where R$_{14}$ represents a methyl group;

one or more nitrile groups (—CN);

one or more nitro groups (—NO$_2$); or one or more —NH$_2$, or —N(CH$_3$)$_2$ groups;

a —C(O)R$_{13}$ acyl group, where is a methyl group;

a —CF$_3$ group; and a heteroaryl group chosen from the group formed by furyl, thienyl, and pyrrolyl.

In a fourteenth embodiment, when n=m=1, the organic compound is of formula (VIII); and in the compound of formula (I), Z is Y, and Y represents an oxygen atom, and, together with the carbon atom to which they are bonded, R$_3$, R$_4$ and R$_5$ form an aryl that contains 6 to 10 carbon atoms, and that is chosen from the group formed by phenyl and benzyl, optionally substituted with:

one or more halogen atoms chosen from among fluorine, chlorine, bromine, and iodine atoms;

one or more alkoxy groups chosen from the group formed by methoxy, ethoxy, propyloxy, butyloxy, pentyloxy, and the branched isomers thereof;

one or more aryloxy groups chosen from between phenoxy and benzyloxy;

one or more alkyl groups chosen from the group formed by methyl, ethyl, propyl, butyl, pentyl, hexyl, heptyl, and the branched isomers thereof;

one or more thioalkoxy groups (—S-alkyl) with the alkyl radical being chosen from the group formed by methyl, ethyl, propyl, butyl, pentyl, hexyl, heptyl, and the branched isomers thereof;

one or more —C(O)R$_{13}$ acyl groups, where R$_{13}$ represents an alkyl group that contains 1 to 12 carbon atoms and that is chosen from the group formed by methyl, ethyl, propyl, butyl, pentyl, hexyl, heptyl, and the branched isomers thereof, an aryl group chosen from the group formed by phenyl, and benzyl, an amino group chosen from the group formed by dimethylamino, and diethylamino, an alkoxy group chosen from the group formed by methoxy, and ethoxy, or an aryloxy group chosen from the group formed by benzyloxy, and phenoxy;

one or more —OC(O)R$_{14}$ carboxyl groups, where R$_{14}$ represents a hydrogen atom, or an alkyl group chosen from the group formed by methyl, ethyl, propyl, butyl, pentyl, hexyl, heptyl, and the branched isomers thereof;

one or more nitrile groups (—CN);

one or more nitro groups (—NO$_2$); or one or more amino groups chosen from the group formed by —NH$_2$, —NHCH$_3$, —N(CH$_3$)$_2$, —N(CH$_2$CH$_3$)$_2$, and —NH(CH$_2$CH$_3$);

In this fourteenth embodiment of the invention, together with the carbon atom to which they are bonded, R$_3$, R$_4$, and R$_5$ form a phenyl group optionally substituted with:

one or more halogen atoms chosen from among fluorine, chlorine, bromine, and iodine atoms;

one or more alkoxy groups chosen from the group formed by methoxy, ethoxy, propyloxy, butyloxy, pentyloxy, and the branched isomers thereof;

one or more aryloxy groups chosen from between phenoxy and benzyloxy;

one or more nitro groups (—NO$_2$); or one or more amino groups chosen from the group formed by —NH$_2$, and —NHCH$_3$.

In a fifteenth embodiment, when n=m=1, the organic compound is of formula (VIII); and in the compound of formula (I), Z is Y and Y represents an oxygen atom, where:

R$_5$ represents a hydrogen atom; and together with the carbon atom to which they are bonded, R$_3$ and R$_4$ form a monocyclic or polycyclic alkyl that contains 3 to 20 carbon atoms and that is chosen from the group formed by cyclopropyl, cyclobutyl, cyclopentyl, cyclohexyl, cycloheptyl, cyclooctyl, bicyclo[2,1,1] hexyl, bicyclo[2,2,1] heptyl, and 2-adamantyl, said monocyclic or polycyclic alkyl group optionally being substituted with:

one or more hydroxy groups;

one or more alkoxy groups in which the alkyl radical contains 1 to 12 carbon atoms and is chosen from the group formed by methoxy, ethoxy, propyloxy, butyloxy, pentyloxy, hexyloxy, heptyloxy, and the branched isomers thereof;

one or more alkenyl groups that contain 2 to 16 carbon atoms, and that are chosen from the group formed by ethylenyl propylenyl, butenyl, pentenyl, hexenyl, heptenyl, octenyl and the branched isomers thereof, said alkenyl groups optionally being substituted with an alkyl group chosen from the group formed by ethyl, propyl, butyl, pentyl, and the branched isomers thereof;
one or more halogenoalkyl groups chosen from the group formed by —$CF_3$, —$CCl_3$, —$CHCl_2$, and —$CClBrCF_3$;
one or more siloxy groups chosen from the group formed by trimethylsiloxy, triethylsiloxy, and butyldiphenylsiloxy; or
one or more aryl groups that contain 6 to 10 carbon atoms and that are chosen from the group formed by phenyl, and benzyl;

In this fifteenth embodiment,
$R_5$ represents a hydrogen atom; and
together with the carbon atom to which they are bonded, $R_3$, and $R_4$ form cycloheptyl or 2-adamantyl.

In a sixteenth embodiment, when n=m=1,
the organic compound is of formula (VIII); and
in the compound of formula (I), Z is Y and Y represents an oxygen atom, where:
$R_5$ represents a hydrogen atom; and
together with the carbon atom to which they are bonded, $R_3$ and $R_4$ form a cyclic alkenyl that contains 3 to 20 carbon atoms and at least one double bond chosen from the group formed by cyclopentenyl, cyclohexenyl, and 2,3,4,7,8,9,11,12,14,15,16,17-dodecahydro-1H-cyclopenta[a]phenanthrenyl; or
together with the carbon atom to which they are bonded, $R_3$, $R_4$ and $R_5$ form a cyclic alkenyl that contains 3 to 20 carbon atoms and at least one double bond chosen from the group formed by cyclopentenyl, and cyclohexenyl,
said cyclic alkenyl group optionally being substituted with:
one or more halogen atoms chosen from among fluorine, chlorine, bromine, and iodine atoms;
one or more alkoxy groups chosen from the group formed by methoxy, ethoxy, propyloxy, butyloxy, pentyloxy, and the branched isomers thereof;
one or more aryloxy groups chosen from between phenoxy and benzyloxy;
one or more alkyl groups chosen from the group formed by methyl, ethyl, propyl, butyl, pentyl, hexyl, heptyl, and the branched isomers thereof;
one or more thioalkoxy groups (—S-alkyl) with the alkyl radical being chosen from the group formed by methyl, ethyl, propyl, butyl, pentyl, hexyl, heptyl, and the branched isomers thereof;
one or more —$C(O)R_{13}$ acyl groups, where $R_{13}$ represents an alkyl group that contains 1 to 12 carbon atoms and that is chosen from the group formed by methyl, ethyl, propyl, butyl, pentyl, hexyl, heptyl, and the branched isomers thereof;
one or more —$OC(O)R_{14}$ carboxyl groups, where $R_{14}$ represents a hydrogen atom, or an alkyl group chosen from the group formed by methyl, ethyl, propyl, butyl, pentyl, hexyl, heptyl, and the branched isomers thereof;
one or more nitrile groups (—CN);
one or more nitro groups (—$NO_2$); or
one or more amino groups chosen from the group formed by $NH_2$, —$NHCH_3$, —$N(CH_3)_2$, —$N(CH_2CH_3)_2$, and —$NH(CH_2CH_3)$;

In this sixteenth embodiment,
$R_5$ represents a hydrogen atom; and
together with the carbon atom to which they are bonded, $R_3$ and $R_4$ form cyclohexenyl, 2,3,4,7,8,9,11,12,14,15,16,17-dodecahydro-1H-cyclopenta[a]phenanthrenyl; or
together with the carbon atom to which they are bonded, $R_3$, $R_4$ and $R_5$ form a cyclohexenyl.

In a seventeenth embodiment, when n=m=1,
the organic compound is of formula (VIII); and
in the compound of formula (I), Z is Y, and Y represents a sulphur atom, and, together with the carbon atom to which they are bonded, $R_3$, $R_4$ and $R_5$ form an aryl that contains 6 to 10 carbon atoms, and that is chosen from the group formed by phenyl and benzyl, optionally substituted with:
one or more halogen atoms chosen from among fluorine, chlorine, bromine, and iodine atoms;
one or more alkoxy groups chosen from the group formed by methoxy, ethoxy, propyloxy, butyloxy, pentyloxy, and the branched isomers thereof;
one or more aryloxy groups chosen from between phenoxy and benzyloxy;
one or more alkyl groups chosen from the group formed by methyl, ethyl, propyl, butyl, pentyl, hexyl, heptyl, and the branched isomers thereof;
one or more thioalkoxy groups (—S-alkyl) with the alkyl radical being chosen from the group formed by methyl, ethyl, propyl, butyl, pentyl, hexyl, heptyl, and the branched isomers thereof;
one or more —$C(O)R_{13}$ acyl groups, where $R_{13}$ represents an alkyl group that contains 1 to 12 carbon atoms and that is chosen from the group formed by methyl, ethyl, propyl, butyl, pentyl, hexyl, heptyl, and the branched isomers thereof;
one or more —$OC(O)R_{14}$ carboxyl groups, where $R_{14}$ represents a hydrogen atom, or an alkyl group chosen from the group formed by methyl, ethyl, propyl, butyl, pentyl, hexyl, heptyl, and the branched isomers thereof;
one or more nitrile groups (—CN);
one or more nitro groups (—$NO_2$); or
one or more amino groups chosen from the group formed by —$NH_2$, —$NHCH_3$, —$N(CH_3)_2$, —$N(CH_2CH_3)_2$, and —$NH(CH_2CH_3)$.

In this seventeenth embodiment of the invention, and together with the carbon atom to which they are bonded, $R_3$, $R_4$ and $R_5$ form a phenyl group that is optionally substituted with one or more alkoxy groups chosen from the group formed by methoxy, ethoxy, propyloxy, butyloxy, pentyloxy, and the branched isomers thereof.

In all of the embodiments and variants of the invention, in the compound of formula (I) and in the silylated formiate of formula (II), and independently from one another, $R_0$, $R_1$ and $R_2$, are chosen from the group formed by an alkoxy group in which the alkyl group contains 1 to 12 carbon atoms, an alkyl group containing 1 to 20 carbon atoms, an aryl group containing 6 to carbon atoms, or an aryloxy group in which the aryl group contains 6 to 20 carbon atoms, said alkyl, aryl, alkoxy, and aryloxy groups optionally being substituted.

In all of the embodiments and variants of the invention, and independently from one another, $R_0$, $R_1$ and $R_2$ may be chosen from the group formed by:
an alkoxy group in which the alkyl group contains 1 to 12 carbon atoms, e.g. methyloxy, ethyloxy, propyloxy and the branched isomers thereof, butyloxy and the branched isomers thereof, the alkyl groups of the alkoxy groups optionally being substituted;

an alkyl group containing 1 to 12 carbon atoms, e.g. methyl, ethyl, propyl, butyl, pentyl, hexyl, heptyl, and the branched isomers thereof, said alkyl groups optionally being substituted; and an aryl group containing 6 to 10 carbon atoms, e.g. phenyl, or benzyl, said aryl groups optionally being substituted.

In all of the embodiments and variants of the invention, the silylated formiate of formula (II) is preferably chosen from the group formed by Me$_3$SiOCHO, Et$_3$SiOCHO, iPr$_3$SiOCHO, MePh$_2$SiOCHO, tBuMe$_2$SiOCHO, and (EtO)$_3$SiOCHO.

The method of the invention may be followed by a step of hydrolysis, of protonolysis, or of solvolysis, in order to cleave the Z—Si bond in the silylated compounds of formula (I). These procedures are generally well known and easily accessible for a person skilled in the art.

In the context of the invention, "protonolysis" means cleavage of a chemical bond by Brønsted acids. Solvolysis means cleavage of a bond by solvent. A particular case of solvolysis is hydrolysis when water is used as a solvent or in large excess.

The method of the invention takes place in the presence of a catalyst. In the sense of the invention, the term "catalyst" is used to mean any compound that is capable of modifying, and in particular of increasing, the speed of the chemical reaction in which it participates, and that is regenerated at the end of the reaction. This definition encompasses both catalysts, i.e. compounds that exercise their catalytic activity without needing to undergo any modification or conversion, and compounds (also referred to as "pre-catalysts") that are added to the reaction medium and that are converted into catalysts.

In the method of the invention, the catalysts are metallic catalysts that are chosen from the group formed by metallic salts or metallic complexes of:
 alkaline earth metals chosen from between magnesium, and calcium; and
 transition metals chosen from among molybdenum, nickel, iron, cobalt, zinc, copper, rhodium, ruthenium, platinum, palladium, and iridium.

The metallic catalyst may be chosen from among:
salts or complexes of alkaline earth metals, which salts or complexes are chosen from the group formed, for example, by MgSO$_4$, MgCl$_2$, Mg(OAc)$_2$, Ca(BF$_4$)$_2$·xH$_2$O, CaCl$_2$, and Ca(OAc)$_2$; and
salts or complexes of transition metals, which salts or complexes are chosen from the group formed, for example, by Fe(BF$_4$)$_2$·6H$_2$O, Fe(acac)$_3$, Fe(OAc)$_2$, FeBr$_2$, Cu(OTf)$_2$, Cu(OAc)$_2$·H$_2$O, Zn(OAc)$_2$, Zn(BDI)Et, ZnEt$_2$, RuCl$_3$·nH$_2$O, Ru(COD)(Methylallyl)$_2$, [Ru(p-cymene)Cl$_2$]$_2$, [Ru(κ$^1$-OAc)(κ$^2$-OAc)(κ$^3$-triphos)], Ru(dmso)$_4$Cl$_2$, Rh$_2$(OOCCH$_3$)$_4$, Rh(acac)$_3$, [Rh(COD)Cl]$_2$, Pd(OAc)$_2$, Pd(PPh$_3$)$_4$, NiCl$_2$, Ni(COD)$_2$, Ni(PPh$_3$)$_2$Cl$_2$, PtCl$_2$, PtCl$_4$, Pt(COD)(Me)$_2$, and Pt(NH$_3$)$_2$Cl$_2$.

The term "metallic complex" is used to mean an organometallic or inorganic coordination compound wherein a metal ion is bonded to an organic or inorganic ligand. An organometallic or inorganic complex may be obtained by mixing a metallic salt with a ligand, which ligand bonds to the metal via phosphorus, carbon, nitrogen, oxygen, hydrogen, or silicon atoms, for example.

For example, the metallic catalyst is obtained:
by mixing a metallic salt of iron, such as, for example Fe(acac)$_3$, Fe(acac)$_2$, or Fe(BF$_4$)$_2$(H$_2$O)$_6$, with a ligand of the phosphine or amine type, such as, for example, TMEDA, dppe, PP$_3$; or indeed
by mixing a zinc salt, such as, for example, ZnCl$_2$, Zn(OAc)$_2$, or ZnEt$_2$ with a ligand of the amine type, such as, for example, TMEDA, pyridine, or carbene A.

The catalysts may, where applicable, be immobilised on heterogeneous supports in order to procure easy separation of said catalyst and/or recycling thereof. Said heterogeneous supports may be chosen from among supports based on: silica gel, and on plastic polymers such as, for example, polystyrene; carbon-containing supports chosen from among carbon nanotubes; silica carbide; alumina; and magnesium chloride (MgCl$_2$).

In the reduction method of the invention, and when necessary, an additive may also be used. The above-mentioned ligands may also act as additives.

In the sense of the invention, "additive" is used to mean any compound capable of increasing the speeds of the desired transformations. This may be the result of a reaction between the catalyst and said additive, e.g. between the catalyst and a ligand, or between the additive and the organic compound of formula (III), (IV), (V), (VI), (VII), (VIII) or (IX) used.

The additives may be chosen from among:
ligands of the phosphine, amine, carboxylate, or carbene N-heterocyclic type;
organic acids in the Brønsted sense of the term;
acids in the Lewis sense of the term;
bases in the Brønsted sense of the term; and
salts of alkali metals.

By way of example, the additive may be chosen from among:
triadamantylephosphine (PAdm$_3$), tris[2-diphenylephosphino)ethyl]phosphine (PP$_3$), 1,1,1-tris(diphenylphosphinomethyl)ethane (triphos), 1,3-Bis(2,6-diisopropylphenyl)imidazol-2-ylidene (IPr), tricyclohexylphosphine, acetate (AcO), acetylacetonate (acac), 1,2-bis-diphenylphosphinoethane (dppe), N,N,N',N'-tetra-methyl-ethylenediamine (TMEDA), N,N'-bis(2,6-diisopropylphenyl) β-dicetiminate (BDI), 1,2-bis(diphenylphosphino)ethane (dppb), or pyridine;
trifluoromethanesulfonic acid (TfOH), trifluoroacetic acid (TFA), or bis(trifluoromethane)sulfonamide (HNTf$_2$);
boron trifluoride (BF$_3$), tris(pentafluorophenyl)borane (B(C$_6$F$_5$)$_3$), or aluminium trichloride (AlCl$_3$);
triethylamine, or potassium tert-butoxide (tBuOK); and
lithium chloride (LiCl), sodium chloride (NaCl), or potassium chloride (KCl).

The N-heterocyclic carbenes optionally used as ligand and additive are N-heterocyclic carbenes coming from an imidazolium salt, said carbenes being, for example, chosen from the group formed by salts of 1,3-bis(2,6-diisopropylphenyl)-1H-imidazol-3-ium (also known as "IPr"), 1,3-bis(2,6-diisopropylphenyl)-4,5-dihydro-1H-imidazol-3-ium (also known as "s-IPr"), 1,3-bis(2,4,6-trimethylphenyl)-1H-imidazol-3-ium (also known as "IMes"), 1,3-bis(2,4,6-trimethylphenyl)-4,5-dihydro-1H-imidazol-3-ium (also known as "s-IMes"), 4,5-dichloro-1,3-bis(2,6-diisopropylphenyl)-1H-imidazol-3-ium (also known as "Cl$_2$—IPr"), 1,3-di-tert-butyl-1H-imidazol-3-ium (also known as "ItBu"), and 1,3-di-tert-butyl-4,5-dihydro-1H-imidazol-3-ium (also known as "s-ItBu"), said salts being in the form of chloride salts or of tetraphenylborate, for example.

Examples of N-heterocyclic carbenes are shown in FIG. 10.

A selection of ligands that are mentioned and that can be used as additives are shown in FIG. 11.

The method of the invention generates a gas pressure resulting from the formation of carbon dioxide and possibly of dihydrogen. The reaction can then take place under the pressure of the gases formed or under atmospheric pressure by collecting the gases, e.g. in a burette. This gas/these gases can be re-used for preparing formic acid, e.g. by electro-reduction of $CO_2$ to 2e–.

The method of the invention may take place in a solvent or in a mixture of at least two solvents. The solvent may be chosen from the group formed by:
  ethers chosen from diethyl ether, THF, diglyme, or 1,4 dioxane;
  hydrocarbons chosen from benzene, or toluene;
  nitrogen-containing solvents chosen from pyridine or acetonitrile;
  sulfoxides chosen from dimethyl sulfoxide;
  alkyl halogenides chosen from chloroform, or methylene chloride; and
  a supercritical fluid chosen from supercritical $CO_2$.

When the silylated formiate of formula (II) is liquid, then in addition to acting as a synthetic hydrosilane equivalent, it may also serve as a solvent. It is then not necessary to add any additional solvent.

The method of the invention takes place at a temperature lying in the range 0° C. to 150° C., and preferably in the range 30° C. to 100° C.

The transfer reaction times depend on the type of organic compound, on the silylated formiate, and on the catalyst that are used. In general, the time taken by the method is in the range 1 minute to 72 hours, and preferably in the range 1 minute to 24 hours.

The various reagents used in the method of the invention (formic acid, chlorosilanes, catalysts, additives, and organic compounds) are, in general, commercially available compounds, or can be prepared by methods known to a person skilled in the art.

The quantity of the organic compound of formula (III), (IV), (V), (VI), (VII), (VIII) or (IX) is 0.1 to 1 molar equivalent, and preferably 0.5 to 1 molar equivalent, limits included, relative to the silylated formiate of formula (II).

The quantity of the catalyst is 0.0001 to 0.2 molar equivalent, and preferably 0.005 to 0.1 molar equivalent, limits included, relative to the organic compound of formula (III), (IV), (V), (VI), (VII), (VIII) or (IX).

When an additive is used, the quantity of the additive is 0.001 to 2 molar equivalents, and preferably 0.01 to 1 molar equivalent, limits included, relative to the organic compound of formula (III), (IV), (V), (VI), (VII), (VIII) or (IX).

The invention also provides use of the method of the invention for preparing compounds of formula (I),
  for preparing reagents for fine chemistry;
  for preparing reagents for heavy chemistry, in particular for the silicone industry; and
  in producing vitamins, pharmaceutical products, adhesives, acrylic fibres, synthetic leathers, and pesticides.

The invention further provides a method for production of vitamins, pharmaceutical products, adhesives, acrylic fibres, synthetic leathers, and pesticides, which method includes a step of preparing an organic compound of formula (I) by implementing the method of the invention.

Other advantages and characteristics of the present invention appear upon reading the following examples that are given by way of illustrative and non-limiting examples, and upon examining the appended figures.

FIG. 1 thus shows the main paths of access to hydrosilanes and chlorosilanes of the "core type": carbothermal reduction of silica $SiO_2$ or of silicates $SiO_4^{4-}$ (step 1); oxidation of metallurgical-grade silicon (step 2); functionalisation of trichlorosilane (step 3);

FIG. 2 shows a summary of the problems related to preparation of hydrosilanes (sections 1 and 2): synthesis of hydrosilanes by reduction and oxidation of silicon (section 1); and redox-neutral synthesis of hydrosilanes by $LiAlH_4$ (section 2);

FIG. 3 shows radical transfer hydrosilylation with the cyclohexa-1,4-diene (1,4-CHDN)s substituted in position 2 with silylated groups (silylated 1,4-CHDNs 1 and 9);

FIG. 4 shows ionic transfer hydrosilylation of 1-methyl-cyclohexene catalysed by $B(C_6F_5)_3$ as described by M. Oestreich et coll. (*Angewandte Chemie Int. Ed.* 2013, 52, 11905-11907);

Figure 1:
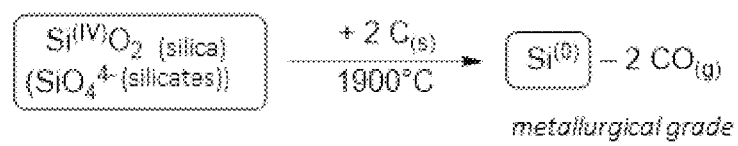
Figure 1:
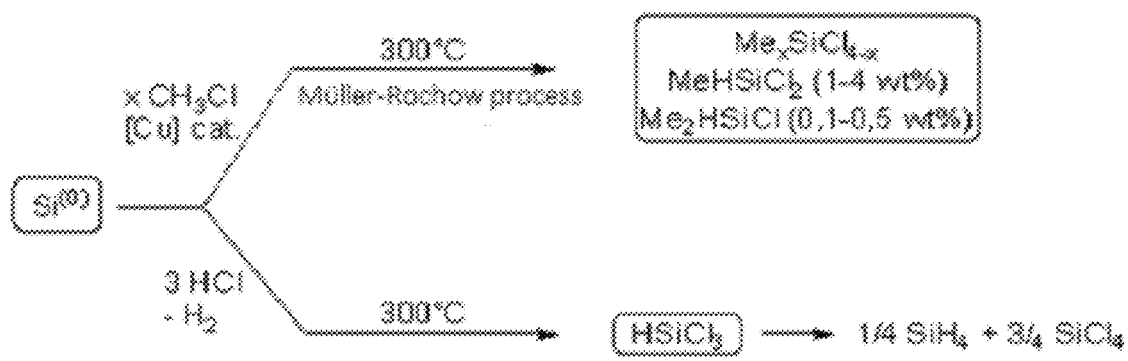
Figure 1:
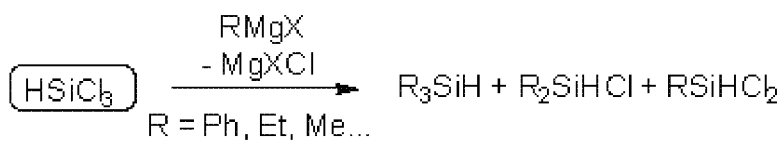
Figure 2:
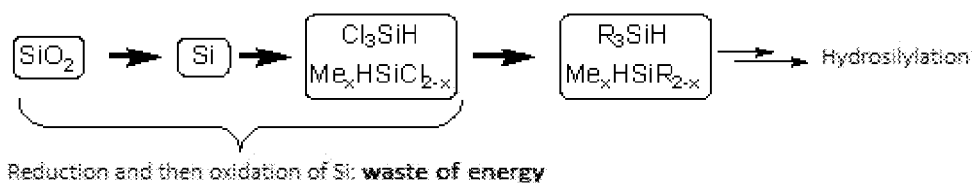
Figure 2:
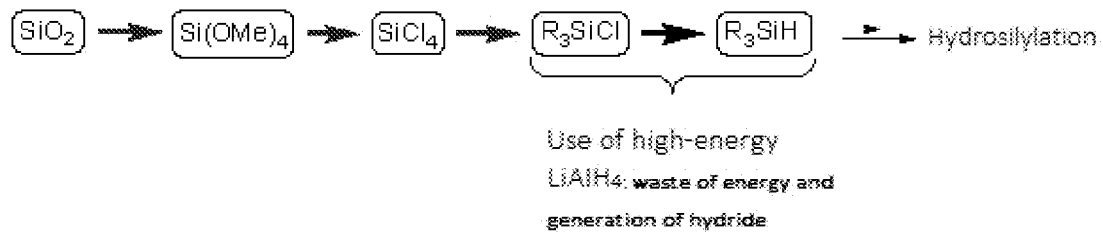
Figure 3:
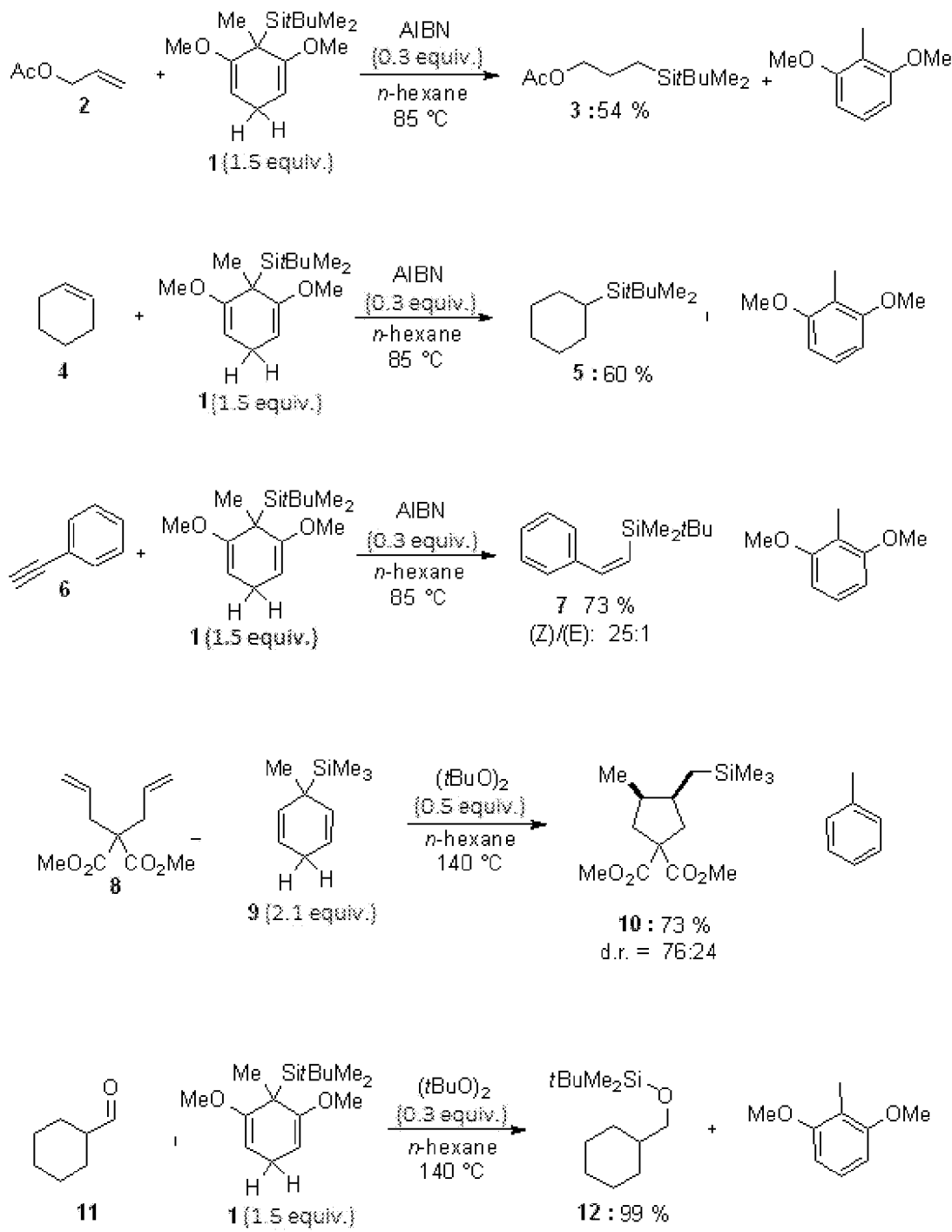
Figure 4:
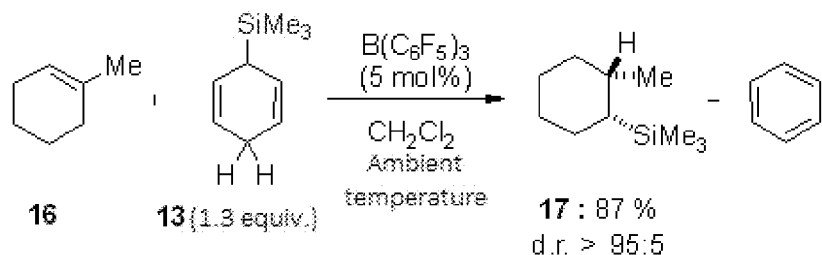
Figure 5:
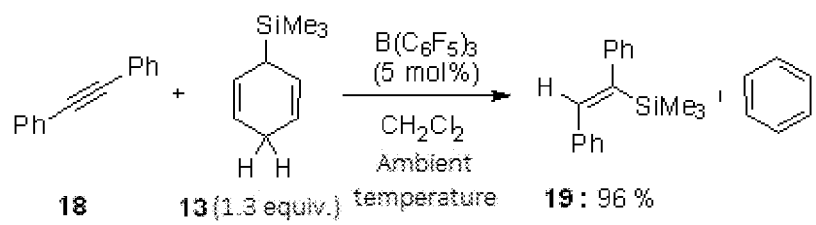
FIG. 5 shows ionic hydrosilylation of alkynes, of ketones, and of imines catalysed by $B(C_6F_5)_3$.
Figure 5:
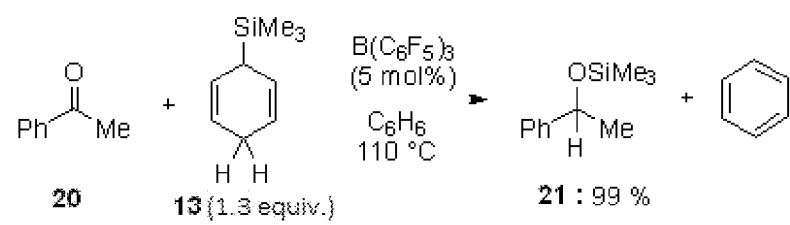
Figure 5:
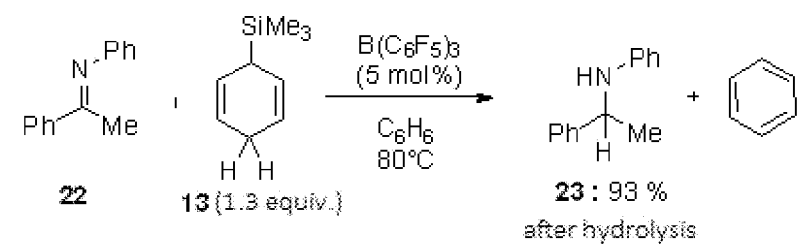
Figure 6:
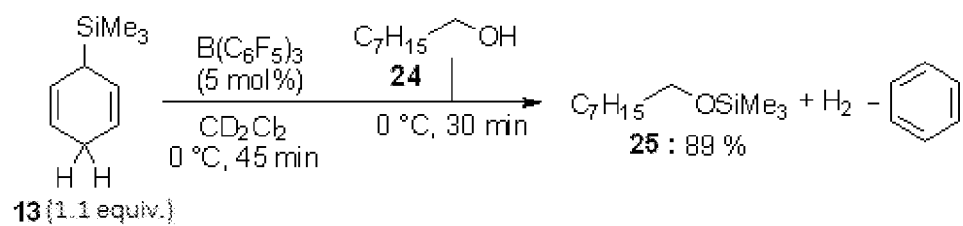
FIG. 6 shows transfer dehydrogenative coupling of octanol (24) catalysed by $B(C_6F_5)_3$ as described by M. Oestreich et coll. (*European Journal of Organic Chemistry* 2014, 2014, 2077-2083)
Figure 7:
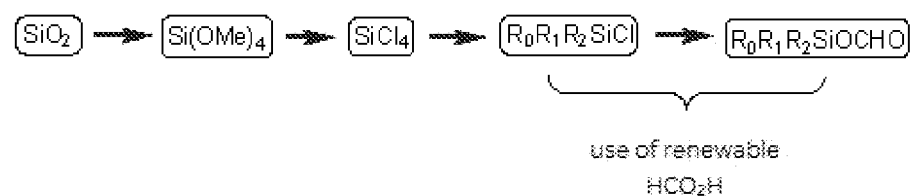
FIG. 7 shows redox-neutral synthesis of silylated formiate as renewable hydrosilane equivalents.
Figure 8:
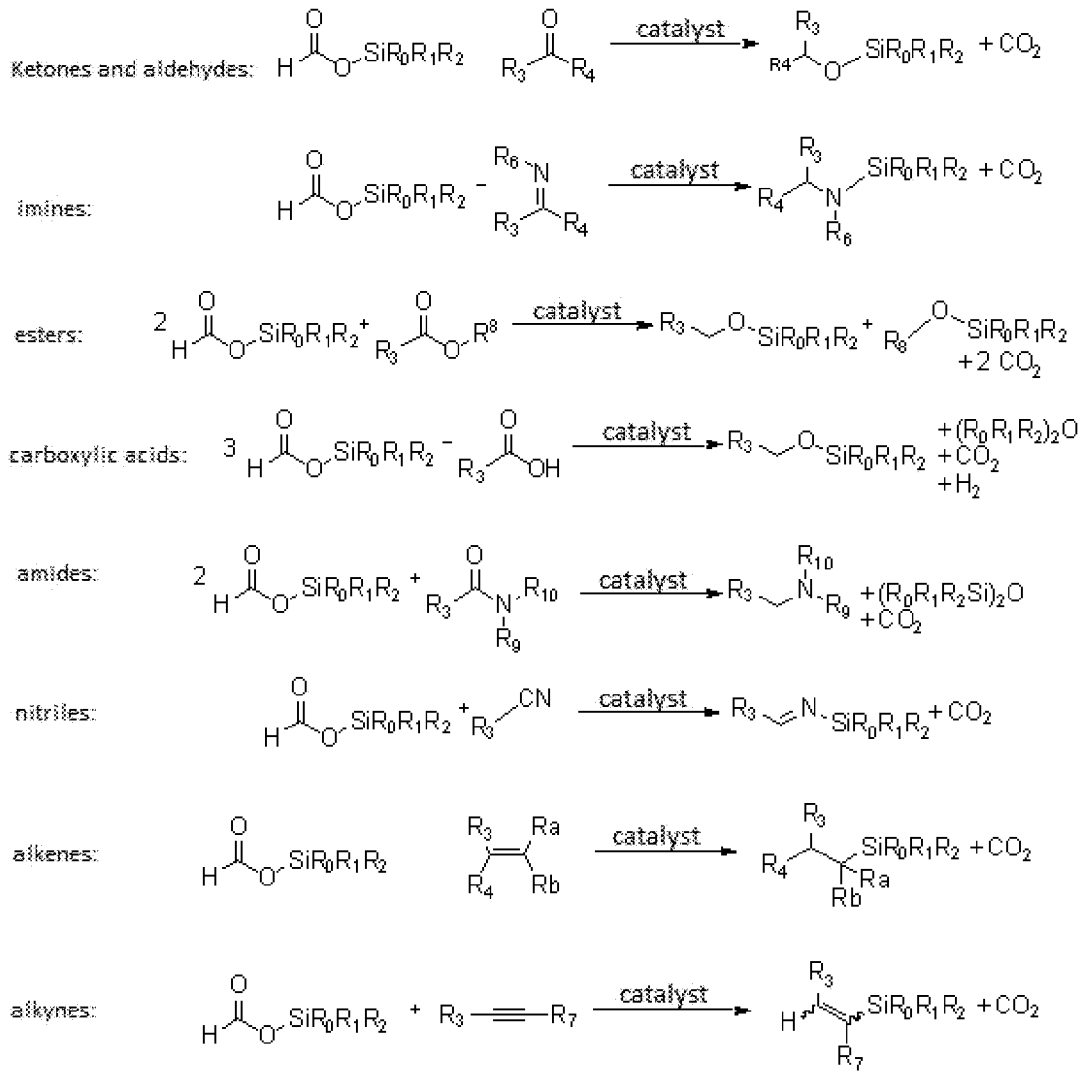
Figure 8:
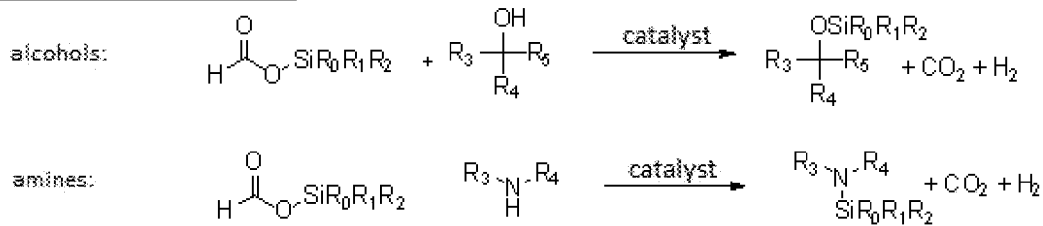
Figure 9:
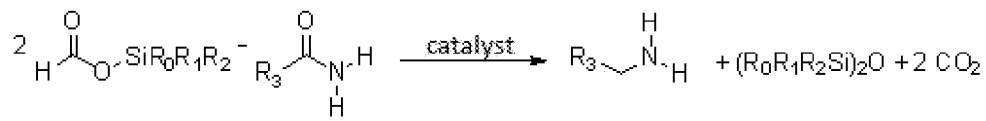
Figure 9:
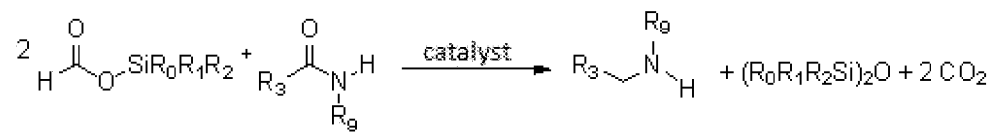
Figure 9:
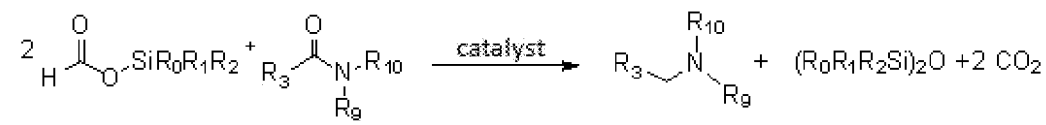
Figure 9:
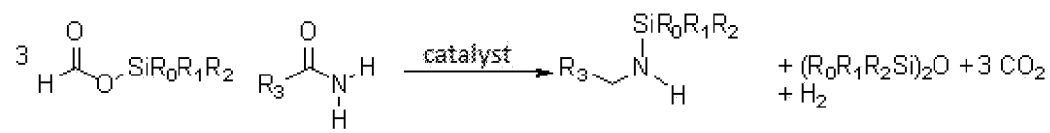
Figure 9:
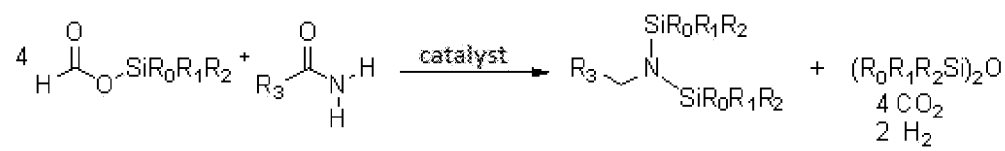
Figure 9:
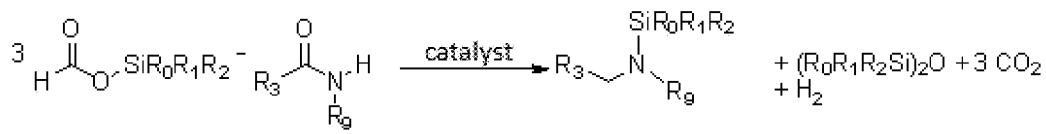
Figure 10:
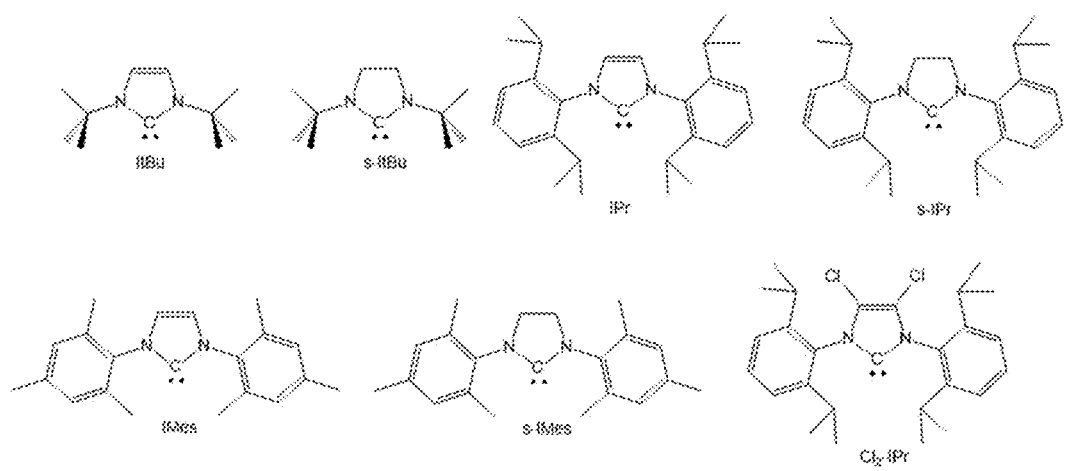
Figure 11:
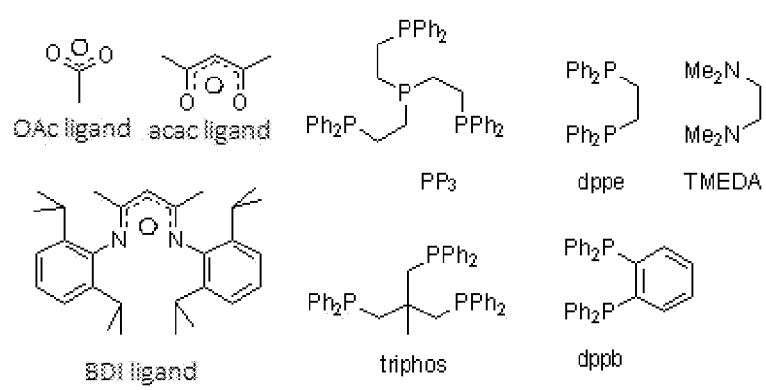

FIG. 8 summarises the transfer hydrosilylation and dehydrogenative coupling reactions with different types of organic substrate;

FIG. 9 summarises the transfer hydrosilylation and transfer dehydrogenative coupling reactions with amides;

FIG. 10 shows examples of N-heterocyclic carbenes that can be used as additives and as ligands; and FIG. 11 shows a selection of ligands that are mentioned above and that can be used as additives.

EXAMPLES

A set of results is presented below, giving examples of transfer hydrosilylation of carbonyls (aldehydes and ketones) (example 1) and of transfer dehydrogenative coupling (example 2) with various silylated formiates. These reactions are catalysed by transition metals, optionally in the presence of additives. The abbreviations used to describe the catalysts used are defined at the end of the table. The yields are obtained by integrating the signals of the silylated product relative to the signals of the mesitylene used as internal standard. In some cases, a yield of isolated product (after purification as described above) is also given.

The yields are always calculated by using the following formula:

$$\rho(\text{transfer}) = \frac{n(\text{product})}{n_0(\text{substrate})}$$

where:
  $\rho$(transfer): yield in terms of optionally silylated product after transfer of the hydrosilane (%)
  $n_0$(substrate): quantity of matter in terms of organic substrate added initially (mmol); and
  n(silylated product): quantity of matter in terms of product after transfer of the hydrosilane (mmol).

Protocol for Preparing the Silylated Formiates of Formula (II)

The silylated formiates of formula (II) may be prepared using any method known to a person skilled in the art. For example, Et3SiOCHO may be prepared from $Et_3SiCl$ and from sodium formiate ($HCO_2Na$) according to the protocol described by F. A. Leblanc, W. E. Piers, M. Parvez, Angew. Chem. Int. Ed., 2014, 53, 789-792. In addition, $Me_3SiOCHO$ may be obtained from $Me_3SiCl$ and from formic aid in the presence of an organic base such as pyridine in diethyl ether according to the protocol described by Etienne (Y. Etienne, C. R. Hebd. Seances Acad. Sci., 1952, 235, 966-968).

In the present invention, the silylated formiates are synthesised from formic acid, from a chlorosilane having the general formula $R_{0(x)}R_{1(y)}R_{2(z)}Si(Cl)_{4-(x+y+z)}$ (x=0 or 1; y=0 or 1; z=0 or 1) optionally in the presence of a base and of a solvent:

For example, these syntheses may be performed according to the following experimental protocol:

1. In an inert atmosphere, in a glovebox, chlorosilane, formic acid (in the range 1 molar equivalent to 4.4 molar equivalents relative to chlorosilane) and, optionally, the solvent are added to a round-bottom flask. The order in which the reagents are added is unimportant. The flask is then removed from the glovebox while maintaining the reaction medium in an inert atmosphere, and the base is added drop-by-drop (in the same proportions as the formic acid) at 0° C. Once the addition of the base is finished, the reaction mixture is heated to ambient temperature and is agitated vigorously for 15 hours in an inert atmosphere. The crude reaction mixture is then filtered through a Buchner funnel, and then the filtrate is transferred to a round-bottom flask and the solvent is evaporated in a vacuum. The resulting residue is purified by fractional distillation. This general protocol is exemplified with the synthesis of $Et_3SiOCHO$ from $Et_3SiCl$:

1. In an inert atmosphere, in a glovebox, $Et_3SiCl$ (10.4 mL, 62 mmol, 1 equiv.), anhydrous ether (100 mL) and formic acid (2.4 mL, 62 mmol, 1 equiv.) are added to a 500-mL round-bottom two-neck flask.

2. The flask is then removed from the glovebox while maintaining the reaction medium in an inert atmosphere, and the triethylamine is added drop-by-drop (8.4 mL; 62 mmol; 1 equiv.) at 0° C. Once the addition of the triethylamine is finished, the reaction mixture is heated to ambient temperature and is agitated vigorously for 15 hours in an inert atmosphere. The crude reaction mixture is then filtered through a Buchner funnel, the solid is washed with diethyl ether (3×20 mL) and then with pentane (20 mL). The filtrate is transferred to a round-bottom flask and the volatile compounds are evaporated in a vacuum at 0° C. The resulting residue is purified by fractional distillation to obtain 6.1 g (61%) of the colourless liquid $Et_3SiOCHO$ (62° C.-64° C. at 27 mmHg). The following table gives some results obtained for synthesis of various silylated formiates:

| Chlorosilane (mmol) | Quantity of formic acid (mmol) | Base (mmol) | Solvent (mL) | Silylated formiate | Yield (%) |
|---|---|---|---|---|---|
| $Me_3SiCl$ (85) | 85 | Pyridine (85) | $Et_2O$ (20) | $Me_3SiOCHO$ | 67% |
| $Et_3SiCl$ (62) | 62 | $NEt_3$ (62) | $Et_2O$ (100) | $Et_3SiOCHO$ | 61% |
| $(iPr)_3SiCl$ (24.7) | 24.7 | $NEt_3$ (25) | $Et_2O$ (50) | $(iPr)_3SiOCHO$ | 58% |
| $Ph_2MeSiCl$ (19) | 19.2 | $NEt_3$ (19.2) | $Et_2O$ (50) | $Ph_2MeSiOCHO$ | 65% |
| $(EtO)_3SiCl$ (24) | 24 | $NEt_3$ (24.1) | $Et_2O$ (50) | $(EtO)_3SiOCHO$ | 57% |

Once the silylated formiates have been obtained, the method of the invention can be implemented according to the following experimental protocol:

1. In an inert atmosphere, in a glovebox, the silylated formiate having the general formula $R_{0(x)}R_{1(y)}R_{2(z)}Si(OCHO)_{4-(x+y+z)}$ (x=0 or 1; y=0 or 1; z=0 or 1) (0.1 molar equivalents to 500 molar equivalents relative to the organic compound), the organic compound, the catalyst (from 0.001 molar equivalents to 0.5 molar equivalents relative to the organic compound) and/or the solvent and/or the additive are added to a Schlenk tube that may optionally be sealed with a J. Young stopcock. The order in which the reagents are added is unimportant.

2. The reaction mixture is then agitated in an inert atmosphere at a temperature lying in the range 0° C. to 150° C. (preferably >40° C.) until the organic substrate is totally converted (reaction time in the range 1 minute to 72 hours). The reaction is monitored by $^1H$ (proton) NMR and/or by $^{13}C$ (carbon-13) NMR and/or by gas chromatography-mass spectrometry (GC-MS) and/or by thin-layer chromatography (TLC). Once the reaction is finished, and if the reaction has been conducted in a sealed tube, the pressure in the tube is released. In all cases, the solvent is evaporated in a vacuum. The resulting residue after evaporation of the solvent is then purified by distillation or by column chromatography on silica gel or on alumina.

This general protocol is exemplified below with transfer hydrosilylation of benzaldehyde in the presence of $Et_3SiOCHO$ and of the catalyst [Ru(κ$^1$-OAc)(κ$^2$-OAc)(κ$^3$-triphos)]:

1. In an inert atmosphere, in a glovebox, the catalyst Ru(κ$^1$-OAc)(κ$^2$-OAc)(κ$^3$-triphos)] (8.5 mg; 0.01 mmol) and acetonitrile (2 mL) are added to a 10-mL Schlenk tube. The resulting reaction mixture is agitated for 5 minutes until a homogenous yellow solution is obtained, and then the benzaldehyde (51 µL; 0.5 mmol; 1 equiv.) and $Et_3SiOCHO$ (96 mg; 0.6 mmol; 1.2 equiv.) are added to the reaction medium. The Schlenk tube is then sealed and the reaction medium is agitated in an inert atmosphere at a temperature lying in the range 70° C. to conversion for 1 hour.

3. The volatile compounds are evaporated in a vacuum and the resulting residue is purified by column chromatography on silica gel (99:1 petroleum ether/ethyl acetate). $PhCH_2OSiEt_3$ (colourless oil) is obtained with a yield of 91%.

Example 1: Transfer Hydrosilylation $$\underset{H}{\overset{O}{\|}}{-}O{-}SiRR^1R^2 + \underset{R^3}{\overset{O}{\|}}{-}R^4 \xrightarrow{\text{catalyst}} \underset{R^4}{\overset{R^3}{|}}{-}O{-}SiRR^1R^2 + CO_2 \quad (1)$$

| Silylated formiate | Substrate | Catalyst (% mol) | Additive | Solvent | t (h)/ T (° C.) | Product | Yield (%) |
|---|---|---|---|---|---|---|---|
| Et$_3$SiOCHO | PhCHO | [Ru(p-cymene)Cl$_2$]$_2$ (2) | — | MeCN | 26/100 | PhCH$_2$OSiEt$_3$ | 73 |
| Et$_3$SiOCHO | PhCHO | [RuCl$_2$(dmso)$_4$] (4) | triphos | MeCN | 1.5/95 | PhCH$_2$OSiEt$_3$ | >99 |
| Et$_3$SiOCHO | PhCHO | [Ru(p-cymene)Cl$_2$]$_2$ (2) | triphos | MeCN | 22/70 | PhCH$_2$OSiEt$_3$ | >99 |
| Et$_3$SiOCHO | PhCHO | [Ru(p-cymene)Cl$_2$]$_2$ (2) | PAdm$_3$ | MeCN | 26/100 | PhCH$_2$OSiEt$_3$ | |
| Et$_3$SiOCHO | PhCHO | Ru(Me-allyl)$_2$(COD) (4) | — | MeCN | 7/70 | PhCH$_2$OSiEt$_3$ | >99 |
| Et$_3$SiOCHO | PhCHO | Ru(Me-allyl)$_2$(COD) (4) | dppp | MeCN | 3.5/70 | PhCH$_2$OSiEt$_3$ | >99 |
| Et$_3$SiOCHO | PhCHO | Ru(Me-allyl)$_2$(COD) (4) | triphos | MeCN | 50 min/70 | PhCH$_2$OSiEt$_3$ | >99 |
| Et$_3$SiOCHO | PhCHO | [Ru(k$^1$-OAc)(k$^2$-OAc)(k$^3$-triphos)] (4) | — | MeCN | >5 min/70 | PhCH$_2$OSiEt$_3$ | >99 |
| Et$_3$SiOCHO | PhCHO | [Ru(k$^1$-OAc)(k$^2$-OAc)(k$^3$-triphos)] (4) | — | MeCN | 14/TA | PhCH$_2$OSiEt$_3$ | >99 |
| Et$_3$SiOCHO | PhCHO | [Ru(k$^1$-OAc)(k$^2$-OAc)(k$^3$-triphos)] (2) | — | MeCN | 0.5/70 | PhCH$_2$OSiEt$_3$ | >99 |
| Et$_3$SiOCHO | PhCHO | [Ru(k$^1$-OAc)(k$^2$-OAc)(k$^3$-triphos)] (2) | — | THF | 0.5/70 | PhCH$_2$OSiEt$_3$ | >99 |
| Me$_3$SiOCHO | PhCHO | [Ru(k$^1$-OAc)(k$^2$-OAc)(k$^3$-triphos)] (2) | — | MeCN | 0.5/70 | PhCH$_2$OSiMe$_3$ | >99 |
| Ph$_2$MeSiOCHO | PhCHO | [Ru(k$^1$-OAc)(k$^2$-OAc)(k$^3$-triphos)] (2) | — | MeCN | 0.5/70 | PhCH$_2$OSiMePH$_2$ | >99 |
| (EtO)$_3$SiOCHO | PhCHO | [Ru(k$^1$-OAc)(k$^2$-OAc)(k$^3$-triphos)] (2) | — | MeCN | 2/70 | PhCH$_2$OSi(OEt)$_3$ | 50 |
| Et$_3$SiOCHO | 4-Cl-C$_6$H$_4$-CHO | [Ru(k$^1$-OAc)(k$^2$-OAc)(k$^3$-triphos)] (2) | — | MeCN | 0.5/70 | 4-Cl-C$_6$H$_4$-CH$_2$OSiEt$_3$ | >99 |
| Et$_3$SiOCHO | 4-Br-C$_6$H$_4$-CHO | [Ru(k$^1$-OAc)(k$^2$-OAc)(k$^3$-triphos)] (2) | — | MeCN | 0.5/70 | 4-Br-C$_6$H$_4$-CH$_2$OSiEt$_3$ | >99 |
| Et$_3$SiOCHO | 4-MeO-C$_6$H$_4$-CHO | [Ru(k$^1$-OAc)(k$^2$-OAc)(k$^3$-triphos)] (2) | — | MeCN | 0.5/70 | 4-MeO-C$_6$H$_4$-CH$_2$OSiEt$_3$ | >99 |
| Et$_3$SiOCHO | 4-MeS-C$_6$H$_4$-CHO | [Ru(k$^1$-OAc)(k$^2$-OAc)(k$^3$-triphos)] (2) | — | MeCN | 0.5/70 | 4-MeS-C$_6$H$_4$-CH$_2$OSiEt$_3$ | >99 (95) |
| Et$_3$SiOCHO | 4-tBu-C$_6$H$_4$-CHO | [Ru(k$^1$-OAc)(k$^2$-OAc)(k$^3$-triphos)] (2) | — | MeCN | 0.5/70 | 4-tBu-C$_6$H$_4$-CH$_2$OSiEt$_3$ | >99 (92) |

-continued

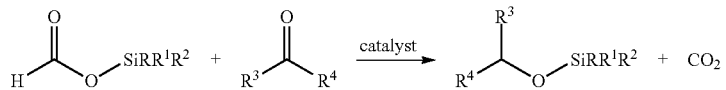
(1)

| Silylated formiate | Substrate | Catalyst (% mol) | Additive | Solvent | t (h)/ T (° C.) | Product | Yield (%) |
|---|---|---|---|---|---|---|---|
| Et$_3$SiOCHO | 4-methylbenzaldehyde | [Ru(k$^1$-OAc)(k$^2$-OAc)(k$^3$-triphos)] (2) | — | MeCN | 0.5/70 | 4-methylbenzyl OSiEt$_3$ | >99 |
| Et$_3$SiOCHO | 2-methylbenzaldehyde | [Ru(k$^1$-OAc)(k$^2$-OAc)(k$^3$-triphos)] (2) | — | MeCN | 0.5/70 | 2-methylbenzyl OSiEt$_3$ | >99 |
| Et$_3$SiOCHO | 4-acetylbenzaldehyde | [Ru(k$^1$-OAc)(k$^2$-OAc)(k$^3$-triphos)] (2) | — | MeCN | 0.5/70 | 4-acetylbenzyl OSiEt$_3$ | >99 |
| Et$_3$SiOCHO | methyl 3-formylbenzoate | [Ru(k$^1$-OAc)(k$^2$-OAc)(k$^3$-triphos)] (2) | — | MeCN | 0.5/70 | methyl 3-(silyloxymethyl)benzoate | >99 |
| Et$_3$SiOCHO | 4-cyanobenzaldehyde | [Ru(k$^1$-OAc)(k$^2$-OAc)(k$^3$-triphos)] (2) | — | MeCN | 0.5/70 | 4-cyanobenzyl OSiEt$_3$ | 91 |
| Et$_3$SiOCHO | 4-nitrobenzaldehyde | [Ru(k$^1$-OAc)(k$^2$-OAc)(k$^3$-triphos)] (2) | — | MeCN | 0.5/70 | 4-nitrobenzyl OSiEt$_3$ | >99 |
| Et$_3$SiOCHO | 4-dimethylaminobenzaldehyde | [Ru(k$^1$-OAc)(k$^2$-OAc)(k$^3$-triphos)] (2) | — | MeCN | 1.5/70 | 4-dimethylaminobenzyl OSiEt$_3$ | >99 |
| Et$_3$SiOCHO | pyridine-2-carbaldehyde | [Ru(k$^1$-OAc)(k$^2$-OAc)(k$^3$-triphos)] (2) | — | MeCN | 0.5/70 | 2-pyridylmethyl OSiEt$_3$ | >99 |
| Et$_3$SiOCHO | furan-2-carbaldehyde | [Ru(k$^1$-OAc)(k$^2$-OAc)(k$^3$-triphos)] (2) | — | MeCN | 0.5/70 | furfuryl OSiEt$_3$ | >99 |
| Et$_3$SiOCHO | thiophene-2-carbaldehyde | [Ru(k$^1$-OAc)(k$^2$-OAc)(k$^3$-triphos)] (2) | — | MeCN | 0.5/70 | 2-thienylmethyl OSiEt$_3$ | >99 |
| Et$_3$SiOCHO | C$_5$H$_{11}$CHO | [Ru(k$^1$-OAc)(k$^2$-OAc)(k$^3$-triphos)] (2) | — | MeCN | 0.5/70 | C$_5$H$_{11}$CH$_2$OSiEt$_3$ | >99 |
| Et$_3$SiOCHO | cyclohex-3-enecarbaldehyde | [Ru(k$^1$-OAc)(k$^2$-OAc)(k$^3$-triphos)] (2) | — | MeCN | 0.5/70 | (cyclohex-3-enyl)methyl OSiEt$_3$ | >99 (95) |

-continued $$\underset{H}{\overset{O}{\|}}{-}O{-}SiRR^1R^2 + \underset{R^4}{\overset{O}{\|}}{-}R^3 \xrightarrow{catalyst} \underset{R^4}{\overset{R^3}{|}}{-}O{-}SiRR^1R^2 + CO_2 \quad (1)$$

| Silylated formiate | Substrate | Catalyst (% mol) | Additive | Solvent | t (h)/ T (° C.) | Product | Yield (%) |
|---|---|---|---|---|---|---|---|
| Et₃SiOCHO | cyclohexenyl-CHO | [Ru(k¹-OAc)(k²-OAc)(k³-triphos)] (2) | — | MeCN | 0.5/70 | cyclohexenyl-CH₂-OSiEt₃ | >99 (90) |
| Et₃SiOCHO | Ph-CH=CH-CHO | [Ru(k¹-OAc)(k²-OAc)(k³-triphos)] (2) | — | MeCN | 0.5/70 | Ph-CH=CH-CH₂-OSiEt₃ | >99 |
| Et₃SiOCHO | Ph-CH=C(Me)-CHO | [Ru(k¹-OAc)(k²-OAc)(k³-triphos)] (2) | — | MeCN | 0.5/70 | Ph-CH=C(Me)-CH₂-OSiEt₃ | >99 (85) |
| Et₃SiOCHO | Ph₂C=CH-CHO | [Ru(k¹-OAc)(k²-OAc)(k³-triphos)] (2) | — | MeCN | 0.5/70 | Ph₂C=CH-CH₂-OSiEt₃ | >99 (98) |
| Et₃SiOCHO | F₃C-C(O)-Ph | [Ru(k¹-OAc)(k²-OAc)(k³-triphos)] (2) | — | MeCN | 0.5/70 | F₃C-CH(OSiEt₃)-Ph | >99 |

Reaction conditions: silylated formiate (0.12-0.15 mmol); carbonyl (0.1 mmol); solvent (0.4 mL). The yields in parentheses are isolated yields after purification and are determined by adapting the preceding reaction conditions so that the quantity of substrate is 0.5 mmol.

The abbreviations used to describe the catalysts and the additives used are: dppp (1,3-bis(diphenylphosphino)propane); triphos (1,1,1-tris(diphenylphosphinomethyl)ethane); COD (cyclooctadiene); Me-allyl (methylallyl); dmso= dimethylsulfoxide; Adm=adamantyl, PAdm₃=triadamantylephosphine.

All of the catalysts, ligands and aldehydes present in the table above are commercially available except for the complex [Ru(κ¹-OAC)(κ²-OAc)(κ³-triphos)] that can easily be synthesised by a person skilled in the art from commercially available reagents according to the protocol described below.

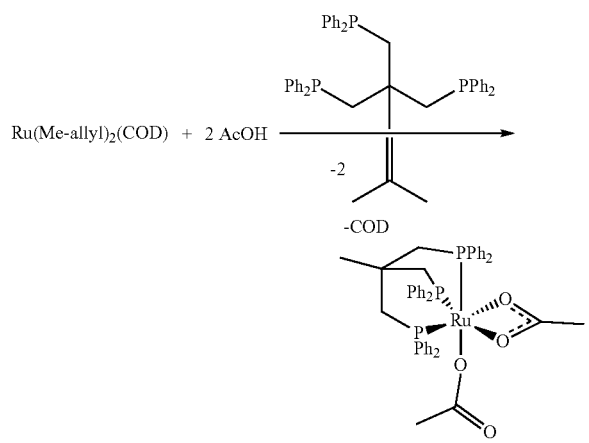

In a glovebox, in an inert atmosphere, the commercially available complex Ru(COD)(methylallyl)₂ (160 mg, 0.5 mmol, 1 equivalent), triphos (0.5 mmol, 312 mg, 1 equivalent) and 20 mL of anhydrous THF are added to a 100-mL round-bottom flask equipped with a J-Young valve. A yellow and homogeneous solution is obtained, to which the acetic acid (70 μL, 1.2 mmol, 2.4 equivalents) is added in one go using a syringe. The flask is then sealed, removed from the glovebox and heated at 90° C. in an oil bath for 15 hours. The reaction mixture is then cooled to ambient temperature (20° C.±5° C.) and the solvent and the volatile compounds are evaporated in a vacuum. A yellow solid is obtained and is taken up in about 5 mL of diethyl ether previously cooled to −20° C. The solid in suspension is then recovered by filtering through a Buchner funnel, washed with 5 mL of Et₂O that is also cooled and dried in a high vacuum (10⁻² mbars). The complex [Ru(κ¹-OAc)(κ²-OAc)(triphos)] (323 mg, 78%) is obtained in the form of a yellow powder and is characterised.

$^1$H NMR (200 MHz, CD₂Cl₂) δ 7.38 (m, 12H), 7.23-7.07 (m, 6H), 6.98 (t, J=6.8 Hz, 12H), 2.20 (s, 6H), 1.87 (s, 6H), 1.51 (s, 3H).

$^{13}$C NMR (50 MHz, CD₂Cl₂) δ 181.74 (s), 137.27 (dd, J=29.0, 15.0 Hz), 132.78 (dd, J=6.4, 3.2 Hz), 129.30 (s), 128.06 (dd, J=6.4, 3.2 Hz), 39.07-38.41 (m), 38.32-37.57 (m), 35.00-33.74 (m), 25.66 (s).

$^{31}$P NMR (81 MHz, CD₂Cl₂) δ 40.99 (s).

Elemental analysis: calcd (%) for C₄₅H₄₅O₄P₃Ru (843.84 g·mol⁻¹): C, 64.05, H, 5.38, found: C, 63.16, H, 5.32.

Example 2: Transfer Dehydrogenative Coupling $$\underset{H}{\overset{O}{\|}}\!\!-\!\!O\!-\!SiRR^1R^2 + \underset{R^5}{\overset{OH}{\underset{|}{R^3\!-\!C\!-\!R^4}}} \xrightarrow{\text{catalyst}} \underset{R^4}{\overset{R^5}{\underset{|}{R^3\!-\!C\!-\!}}}\!\!O\!-\!SiRR^1R^2 + CO_2 + H_2 \quad (2)$$

| Silylated formiate (mmol) | Substrate (mmol) | Catalyst (mmol) | Additive (mmol) | Solvent | t (h)/T (° C.) | Product | Yield (%) |
|---|---|---|---|---|---|---|---|
| Et$_3$SiOCHO (0.15) | PhCH$_2$OH (0.1) | [Ru(k$^1$-OAc)(k$^2$-OAc)(k$^3$-triphos)] (1%) | — | MeCN | 0.5/70 | PhCH$_2$OSiEt$_3$ | >99 |
| Et$_3$SiOCHO (0.15) | PhCH$_2$OH (0.1) | [Ru(k$^1$-OAc)(k$^2$-OAc)(k$^3$-triphos)] (1%) | — | THF | 4.5/70 | PhCH$_2$OSiEt$_3$ | >99 |
| Et$_3$SiOCHO (0.15) | PhCH$_2$OH (0.1) | [Ru(k$^1$-OAc)(k$^2$-OAc)(k$^3$-triphos)] (1%) | — | DCM | 8.5/70 | PhCH$_2$OSiEt$_3$ | >99 |
| Et$_3$SiOCHO (0.15) | PhCH$_2$OH (0.1) | [Ru(k$^1$-OAc)(k$^2$-OAc)(k$^3$-triphos)] (1%) | — | CH$_3$NO$_2$ | 1.5/70 | PhCH$_2$OSiEt$_3$ | >99 |
| iPr$_3$SiOCHO (0.15) | PhCH$_2$OH (0.1) | [Ru(k$^1$-OAc)(k$^2$-OAc)(k$^3$-triphos)] (1%) | — | MeCN | 2.5/70 | PhCH$_2$OSi(iPr)$_3$ | 31 |
| (OEt)$_3$SiOCHO (0.15) | PhCH$_2$OH (0.1) | [Ru(k$^1$-OAc)(k$^2$-OAc)(k$^3$-tiphos)] (1%) | — | MeCN | 18/70 | PhCH$_2$OSi(OEt)$_3$ | 93 |
| MePh$_2$SiOCHO (0.15) | PhCH$_2$OH (0.1) | [Ru(k$^1$-OAc)(k$^2$-OAc)(k$^3$-triphos)] (1%) | — | MeCN | 1/70 | PhCH$_2$OSiMePh$_2$ | >99 |
| Me$_3$SiOCHO (0.15) | PhCH$_2$OH (0.1) | [Ru(k$^1$-OAc)(k$^2$-OAc)(k$^3$-triphos)] (1%) | — | MeCN | 1/70 | PhCH$_2$OSiMe$_3$ | >99 |
| Et$_3$SiOCHO (0.15) | 4-MeO-C$_6$H$_4$-OH (0.1) | [Ru(k$^1$-OAc)(k$^2$-OAc)(k$^3$-triphos)] (1%) | — | MeCN | 1/70 | 4-MeO-C$_6$H$_4$-OSiEt$_3$ | 93 |
| iPr$_3$SiOCHO (0.15) | 4-MeO-C$_6$H$_4$-OH (0.1) | [Ru(k$^1$-OAc)(k$^2$-OAc)(k$^3$-triphos)] (1%) | — | MeCN | 2.5/70 | 4-MeO-C$_6$H$_4$-OSi(iPr)$_3$ | >99 |
| (OEt)$_3$SiOCHO (0.15) | 4-MeO-C$_6$H$_4$-OH (0.1) | [Ru(k$^1$-OAc)(k$^2$-OAc)(k$^3$-triphos)] (1%) | — | MeCN | 18/70 | 4-MeO-C$_6$H$_4$-OSi(OEt)$_3$ | 62 |

-continued

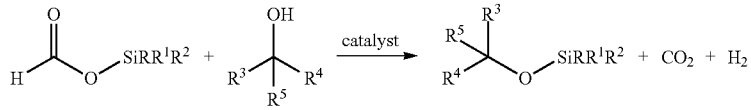

(2)

| Silylated formiate (mmol) | Substrate (mmol) | Catalyst (mmol) | Additive (mmol) | Solvent | t (h)/T (° C.) | Product | Yield (%) |
|---|---|---|---|---|---|---|---|
| MePh$_2$SiOCHO (0.15) | 4-MeO-C$_6$H$_4$-OH (0.1) | [Ru(k$^1$-OAc)(k$^2$-OAc)(k$^3$-triphos)] (1%) | — | MeCN | 1/70 | 4-MeO-C$_6$H$_4$-OSiMePh$_2$ | >99 |
| Me$_3$SiOCHO (0.15) | 4-MeO-C$_6$H$_4$-OH (0.1) | Ru(k$^1$-OAc)(k$^2$-OAc)(k$^3$-triphos)] (1%) | — | MeCN | 1/70 | 4-MeO-C$_6$H$_4$-OSiMe$_3$ | >99 |
| Et$_3$SiCHO (0.15) | 4-MeO-C$_6$H$_4$-OH (0.1) | [Ru(k$^1$-OAc)(k$^2$-OAc)(k$^3$-triphos)] (1%) | — | Dichloromethane (DCM) | 1/70 | 4-MeO-C$_6$H$_4$-OSiEt$_3$ | >99 |
| Et$_3$SiOCHO (0.15) | 4-MeO-C$_6$H$_4$-OH (0.1) | [Ru(k$^1$-OAc)(k$^2$-OAc)(k$^3$-triphos)] (1%) | — | Benzene | 1/70 | 4-MeO-C$_6$H$_4$-OSiEt$_3$ | >99 |
| Et$_3$SiOCHO (0.15) | 4-MeO-C$_6$H$_4$-OH (0.1) | [Ru(k$^1$-OAc)(k$^2$-OAc)(k$^3$-triphos)] (1%) | — | THF | 1/70 | 4-MeO-C$_6$H$_4$-OSiEt$_3$ | 95 |
| Et$_3$SiOCHO (0.15) | Acetoin (0.1) | [Ru(k$^1$-OAc)(k$^2$-OAc)(k$^3$-triphos)] (1%) | — | MeCN | 4/70 | 3-(OSiEt$_3$)butan-2-one | 27 |
| Et$_3$SiOCHO (0.15) | 2-phenylpropan-1-ol (0.1) | [Ru(k$^1$-OAc)(k-OAc)(k$^3$-triphos)] (1%) | — | MeCN | 1/70 | 2-phenylpropyl-OSiEt$_3$ | >99 |
| Et$_3$SiOCHO (0.15) | 2-methylallyl alcohol (0.1) | [Ru(k$^1$-OAc)(k$^2$-OAc)(k$^3$-triphos)] (1%) | — | MeCN | 1/70 | 2-methylallyl-OSiEt$_3$ | >99 (1%) |

-continued

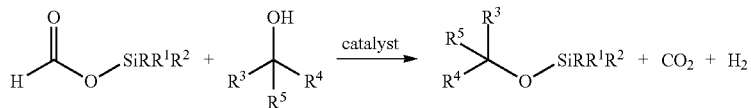

(2)

| Silylated formiate (mmol) | Substrate (mmol) | Catalyst (mmol) | Additive (mmol) | Solvent | t (h)/T (° C.) | Product | Yield (%) |
|---|---|---|---|---|---|---|---|
| Et$_3$SiOCHO (0.15) | 4-bromophenol (0.1) | [Ru(k$^1$-OAc)(k$^2$-OAc)(k$^3$-triphos)] (1%) | — | MeCN | 1/70 | 4-Br-C$_6$H$_4$-OSiEt$_3$ | 98 |
| Et$_3$SiOCHO (0.15) | 4-bromo-(OSiEt$_3$)benzene (0.1) | [Ru(k$^1$-OAc)(k$^2$-OAc)(k$^3$-triphos)] (1%) | — | MeCN | 1/70 | 4-Br-C$_6$H$_4$-OSiMe$_3$ | >99 |
| Et$_3$SiOCHO (0.15) | 4-nitrobenzyl alcohol (0.1) | [Ru(k$^1$-OAc)(k$^2$-OAc)(k$^3$-triphos)] (1%) | — | MeCN | 1/70 | 4-O$_2$N-C$_6$H$_4$-CH$_2$-OSiEt$_3$ | >99 |
| Et$_3$SiOCHO (0.15) | 4-benzyloxyphenol (0.1) | [Ru(k$^1$-OAc)(k$^2$-OAc)(k$^3$-triphos)] (1%) | — | MeCN | 1/70 | 4-BnO-C$_6$H$_4$-OSiEt$_3$ | >99 |
| Et$_3$SiOCHO (0.15) | hex-1-en-3-ol (0.1) | [Ru(k$^1$-OAc)(k$^2$-OAc)(k$^3$-triphos)] (1%) | — | MeCN | 1/70 | hex-1-en-3-yl OSiEt$_3$ | 54 |
| Et$_3$SiOCHO (0.15) | 3-methoxy-3-methylbutan-1-ol (0.1) | [Ru(k$^1$-OAc)(k$^2$-OAc)(k$^3$-triphos)] (1%) | — | MeCN | 1/70 | Et$_3$SiO-CH$_2$CH$_2$-C(CH$_3$)$_2$-OMe | 95 |
| Et$_3$SiOCHO (0.15) | testosterone (0.1) | [Ru(k$^1$-OAc)(k$^2$-OAc)(k$^3$-triphos)] (1%) | — | MeCN | 5/70 | testosterone OSiEt$_3$ | 65 |
| Et$_3$SiOCHO (0.15) | cycloheptanol (0.1) | [Ru(k$^1$-OAc)(k$^2$-OAc)(k$^3$-triphos)] (1%) | — | MeCN | 1/70 | cycloheptyl OSiEt$_3$ | 90 |

-continued (2)

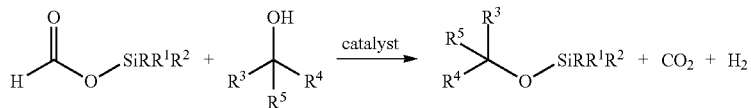

| Silylated formiate (mmol) | Substrate (mmol) | Catalyst (mmol) | Additive (mmol) | Solvent | t (h)/T (° C.) | Product | Yield (%) |
|---|---|---|---|---|---|---|---|
| Et$_3$SiOCHO (0.15) | iPrOH (0.1) | [Ru(k$^1$-OAc)(k$^2$-OAc)(k$^3$-triphos)] (1%) | — | MeCN | 1/70 | iPr-OSiEt$_3$ | 80 |
| Et$_3$SiOCHO (0.15) | 3-(dimethylamino)phenol (0.1) | [Ru(k$^1$-OAc)(k$^2$-OAc)(k$^3$-triphos)] (1%) | — | MeCN | 1/70 | 3-(dimethylamino)phenyl OSiEt$_3$ | >99 |
| Et$_3$SiOCHO (0.15) | 2-phenylethanol (0.1) | [Ru(k$^1$-OAc)(k$^2$-OAc)(k$^3$-triphos)] (1%) | — | MeCN | 1/70 | PhCH$_2$CH$_2$OSiEt$_3$ | 98 |
| Et$_3$SiOCHO (0.15) | 4-iodobenzyl alcohol (0.1) | [Ru(k$^1$-OAc)(k$^2$-OAc)(k$^3$-triphos)] (1%) | — | MeCN | 1/70 | 4-I-C$_6$H$_4$-CH$_2$-OSiEt$_3$ | >99 |
| Me$_3$SiOCHO (0.15) | 2-(hydroxymethyl)-2-methylpropane-1,3-diol (0.1) | [Ru(k$^1$-OAc)(k$^2$-OAc)(k$^3$-triphos)] (1%) | — | MeCN | 1.5/70 | tris(trimethylsilyloxymethyl)methane | >99 |
| Me$_3$SiOCHO (0.15) | 2-adamantanol (0.1) | Ru(k$^1$-OAc)(k$^2$-OAc)(k$^3$-triphos)] (1%) | — | MeCN | 1/70 | 2-adamantyl-OSiMe$_3$ | 98 |
| Me$_3$SiOCHO (0.15) | 1-hexanol (0.1) | [Ru(k$^1$-OAc)(k$^2$-OAc)(k$^3$-triphos)] (1%) | — | MeCN | 1/70 | n-hexyl-OSiMe$_3$ | >99 |
| Et$_3$SiOCHO (0.15) | 2-phenoxyethanol (0.1) | [Ru(k$^1$-OAc)(k$^2$-OAc)(k$^3$-triphos)] (1%) | — | MeCN | 1/70 | PhO-CH$_2$CH$_2$-OSiEt$_3$ | >99 |

-continued $$\underset{H}{\overset{O}{\parallel}}\!\!-\!\!O\text{—SiRR}^1\text{R}^2 + \underset{R^5}{\overset{OH}{\underset{|}{R^3\text{—}\!\!\!\!\!\!\!\!\!\!\!\!\!\!\!-\!\!R^4}}} \xrightarrow{\text{catalyst}} \underset{R^4}{\overset{R^5}{\underset{|}{R^3\text{—}\!\!\!\!\!\!\!\!\!\!\!\!\!\!\!-\!\!O\text{—SiRR}^1\text{R}^2}}} + CO_2 + H_2 \quad (2)$$

| Silylated formiate (mmol) | Substrate (mmol) | Catalyst (mmol) | Additive (mmol) | Solvent | t (h)/T (° C.) | Product | Yield (%) |
|---|---|---|---|---|---|---|---|
| Et$_3$SiOCHO (0.15) | 3,7-dimethyl-oct-6-en-1-ol (0.1) | [Ru(k$^1$-OAc)(k$^2$-OAc)(k$^3$-triphos)] (1%) | — | MeCN | 1/70 | (OSiEt$_3$ derivative) | >99 |
| Et$_3$SiOCHO (0.15) | 4-methoxy-thiophenol (0.1) | [Ru(k$^1$-OAc)(k$^2$-OAc)(k$^3$-triphos)] (1%) | — | MeCN | 18/70 | 4-MeO-C$_6$H$_4$-SSiEt$_3$ | 31 |
| Et$_3$SiOCHO (0.15) | Amino-heptane (0.1) | [Ru(k$^1$-OAc)(k$^2$-OAc)(k$^3$-triphos)] (1%) | — | MeCN | 0.5/70 | C$_7$H$_{15}$NHSiEt$_3$ | 80 |
| Et$_3$SiOCHO (0.15) | Amino-heptane (0.1) | [Ru(k$^1$-OAc)(k-OAc)(k$^3$-triphos)] (1%) | — | MeCN | 96/25 | C$_7$H$_{15}$NHSiEt$_3$ | 80 |
| Et$_3$SiOCHO (0.15) | Morpholine (0.1) | [Ru(k$^1$-OAc)(k$^2$-OAc)(k$^3$-triphos)] (1%) | — | MeCN | 1/70 | N-SiEt$_3$ morpholine | >99 |
| Et$_3$SiOCHO (0.15) | Morpholine (0.1) | [Ru(k$^1$-OAc)(k$^2$-OAc)(k$^3$-triphos)] (1%) | — | MeCN | 96/25 | N-SiEt$_3$ morpholine | >99 |
| Et$_3$SiOCHO (0.15) | 2-aminophenol (0.1) | [Ru(k$^1$-OAc)(k$^2$-OAc)(k$^3$-triphos)] (1%) | — | MeCN | 1/70 | 2-(NH$_2$)C$_6$H$_4$-OSiEt$_3$ | >99 |
| Et$_3$SiOCHO (0.15) | PhCH$_2$OH (0.1) | Fe(OAc)$_2$ (5%) | PP$_3$ (5) | THF | 20/70 | PhCH$_2$OSiEt$_3$ | >99 |
| Et$_3$SiOCHO (0.15) | PhCH$_2$OH (0.1) | Fe(OAc)$_2$ (5%) | PP$_3$ (5) | benzene | 4/70 | PhCH$_2$OSiEt$_3$ | 84 |
| Et$_3$SiOCHO (0.15) | PhCH$_2$OH (0.1) | Fe(OAc)$_2$ (5%) | PP$_3$ (5) | DCM | 0.75/70 | PhCH$_2$OSiEt$_3$ | >99 |
| Et$_3$SiOCHO (0.15) | PhCH$_2$OH (0.1) | FeCl$_2$ (5%) | PP$_3$ (5%) | DCM | 0.75/70 | PhCH$_2$OSiEt$_3$ | 53 |
| Et$_3$SiOCHO (0.15) | PhCH$_2$OH (0.1) | Fe(acac)$_2$ (5%) | PP$_3$ (5%) | DCM | 0.75/70 | PhCH$_2$OSiEt$_3$ | >99 |
| tBuMe$_2$SiOCHO (0.15) | 4-bromophenol (0.1) | [Ru(k$^1$-OAc)(k$^2$-OAc)(k$^3$-triphos)] (1%) | — | MeCN | 1/70 | 4-Br-C$_6$H$_4$-OSitBuMe$_2$ | 98 |
| Et$_3$SiOCHO (0.15) | Acetic acid | [Ru(k$^1$-OAc)(k$^2$-OAc)(k$^3$-triphos)] (1%) | — | MeCN | 2.5/70 | CH$_3$C(O)OSiEt$_3$ | >99 |

-continued (2)

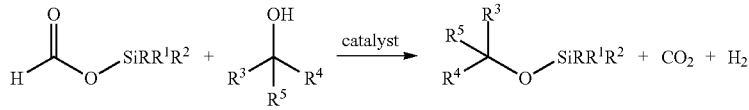

| Silylated formiate (mmol) | Substrate (mmol) | Catalyst (mmol) | Additive (mmol) | Solvent | t (h)/T (° C.) | Product | Yield (%) |
|---|---|---|---|---|---|---|---|
| Et$_3$SiOCHO (0.15) | benzoic acid | [Ru(k$^1$-OAc)(k$^2$-OAc)(k$^3$-triphos)] (1%) | — | MeCN | 2/70 | PhC(O)OSiEt$_3$ | >99 |
| Et$_3$SiOCHO (0.15) | levulinic acid | [Ru(k$^1$-OAc)(k$^2$-OAc)(k$^3$-triphos)] (1%) | — | MeCN | 3/70 | levulinate OSiEt$_3$ | >99 |
| Et$_3$SiOCHO (0.12) | PhCH$_2$OH (0.1) | Fe(OAc)$_2$ (1%) | PP$_3$ (2%) | DCM | 5/70 | PhCH$_2$OSiEt$_3$ | >99 |
| Et$_3$SiOCHO (0.12) | PhCH$_2$OH (0.1) | Fe(OAc)$_2$ (2%) | PP$_3$ (2%) | DCM | 24/70 | PhCH$_2$OSiEt$_3$ | >99 |
| Et$_3$SiOCHO (0.12) | PhCH$_2$OH (0.1) | Fe(OAc)$_2$ (2%) | PP$_3$ (2%) | DCM | 21/20 | PhCH$_2$OSiEt$_3$ | >99 |
| Me$_3$SiOCHO (0.12) | PhCH$_2$OH (0.1) | Fe(OAc)$_2$ (2%) | PP$_3$ (2%) | DCM | 3/70 | PhCH$_2$OSiMe$_3$ | >99 |
| tBuMe$_2$SiOCHO (0.12) | PhCH$_2$OH (0.1) | Fe(OAc)$_2$ (2%) | PP$_3$ (2%) | DCM | 16/70 | PhCH$_2$OSitBuMe$_2$ | 56 |
| iPr$_3$SiOCHO (0.12) | PhCH$_2$OH (0.1) | Fe(OAc)$_2$ (2%) | PP$_3$ (2%) | DCM | 48/70 | PhCH$_2$OSiPr$_3$ | 34 |
| Ph$_2$MeSiOCHO (0.12) | PhCH$_2$OH (0.1) | Fe(OAc)$_2$ (2%) | PP$_3$ (2%) | DCM | 1/70 | PhCH$_2$OSiPh$_2$Me | >99 |
| PhMe$_2$SiOCHO (0.12) | PhCH$_2$OH (0.1) | Fe(OAc)$_2$ (2%) | PP$_3$ (2%) | DCM | 1/70 | PhCH$_2$OSiPhMe$_2$ | >99 |
| Et$_2$Si(OCHO)$_2$ (0.6) | PhCH$_2$OH (0.1) | Fe(OAc)$_2$ (2%) | PP$_3$ (2%) | DCM | 1.5/70 | (PhCH$_2$O)$_2$SiEt$_2$ | 85 |
| Et$_3$SiOCHO (0.12) | 4-MeO-C$_6$H$_4$-OH (0.1) | Fe(OAc)$_2$ (2%) | PP$_3$ (2%) | DCM | 1.5/90 | 4-MeO-C$_6$H$_4$-OSiEt$_3$ | 96 |
| Et$_3$SiOCHO (0.12) | PhCH(Me)CH$_2$OH (0.1) | Fe(OAc)$_2$ (2%) | PP$_3$ (2%) | DCM | 1.5/90 | PhCH(Me)CH$_2$OSiEt$_3$ | >99 |
| Et$_3$SiOCHO (0.12) | methallyl alcohol (0.1) | Fe(OAc)$_2$ (2%) | PP$_3$ (2%) | DCM | 1.5/90 | methallyl-OSiEt$_3$ | 97 |
| Me$_3$SiOCHO (0.12) | 4-Br-C$_6$H$_4$-OH (0.1) | Fe(OAc)$_2$ (2%) | PP$_3$ (2%) | DCM | 1.25/90 | 4-Br-C$_6$H$_4$-OSiMe$_3$ | 84 |

-continued $$\underset{H}{\overset{O}{\|}}\!\!-\!\!O\!-\!SiRR^1R^2 + \underset{R^5}{\overset{OH}{\underset{|}{R^3\!-\!C\!-\!R^4}}} \xrightarrow{catalyst} \underset{R^4}{\overset{R^3}{\underset{|}{R^5\!-\!C}}}\!\!-\!\!O\!-\!SiRR^1R^2 + CO_2 + H_2 \quad (2)$$

| Silylated formiate (mmol) | Substrate (mmol) | Catalyst (mmol) | Additive (mmol) | Solvent | t (h)/T (° C.) | Product | Yield (%) |
|---|---|---|---|---|---|---|---|
| Et₃SiOCHO (0.12) | 4-O₂N-C₆H₄-CH₂OH (0.1) | Fe(OAc)₂ (2%) | PP₃ (2%) | DCM | 3/90 | 4-O₂N-C₆H₄-CH₂OSiEt₃ | 91 |
| Et₃SiOCHO (0.12) | BnO-C₆H₄-OH (0.1) | Fe(OAc)₂ (2%) | PP₃ (2%) | DCM | 1.75/90 | BnO-C₆H₄-OSiEt₃ | 90 |
| Et₃SiOCHO (0.120) | HO-CH₂CH₂-C(CH₃)₂-OMe (0.1) | Fe(OAc)₂ (2%) | PP₃ (2%) | DCM | 1.5/90 | Et₃SiO-CH₂CH₂-C(CH₃)₂-OMe | 87 |
| Me₃SiOCHO (0.12) | testosterone (0.1) | Fe(OAc)₂ (2%) | PP₃ (2%) | DCM | 2/90 | testosterone-OSiMe₃ | 92 |
| Et₃SiOCHO (0.12) | cycloheptanol (0.1) | Fe(OAc)₂ (2%) | PP₃ (2%) | DCM | 1/90 | cycloheptyl-OSiEt₃ | 96 |
| Et₃SiOCHO (0.12) | PhCH₂CH₂OH (0.1) | Fe(OAc)₂ (2%) | PP₃ (2%) | DCM | 1/90 | PhCH₂CH₂OSiEt₃ | 97 |
| Et₃SiOCHO (0.12) | 4-I-C₆H₄-CH₂OH (0.1) | Fe(OAc)₂ (2%) | PP₃ (2%) | DCM | 3.75/90 | 4-I-C₆H₄-CH₂OSiEt₃ | 94 |
| Et₃SiOCHO (0.12) | PhO-CH₂CH₂-OH (0.1) | Fe(OAc)₂ (2%) | PP₃ (2%) | DCM | 2.25/90 | PhO-CH₂CH₂-OSiEt₃ | >99 |

-continued $$\text{(2)}$$

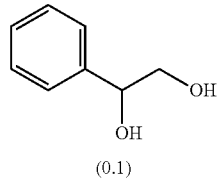

| Silylated formiate (mmol) | Substrate (mmol) | Catalyst (mmol) | Additive (mmol) | Solvent | t (h)/T (° C.) | Product | Yield (%) |
|---|---|---|---|---|---|---|---|
| Et$_3$SiOCHO (0.24) | 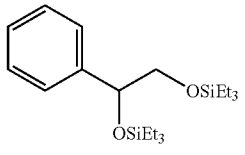 (0.1) | Fe(OAc)$_2$ (2%) | PP$_3$ (2%) | DCM | 1.75/90 | 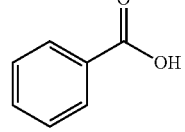 | 96 |
| Et$_3$SiOCHO (0.120 | 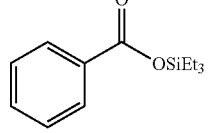 | Fe(OAc)$_2$ (2%) | PP$_3$ (2%) | DCM | 0.75/90 | 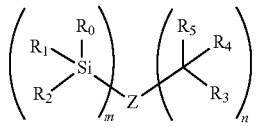 | 97 |

DCM = dichloromethane.

The invention claimed is:

1. A method of preparing compounds of formula (I)

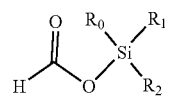

(I)

comprising reacting compound of Formula II with an organic compound of Formula (V), (VI), (VIII) or (IX), where:
independently from one another, $R_0$, $R_1$, and $R_2$ are chosen from the group consisting of an alkoxy group, an aryloxy group, an alkyl group, a carboxyl group, an aryl group, and a siloxy group, said alkyl, aryl, alkoxy, aryloxy or siloxy groups optionally being substituted,
n=0 or 1;
m=1;
when n=0 and m=1, Z is —NR$_3$R$_4$ where:
independently from each other, $R_3$ and $R_4$ are chosen from the group consisting of a hydrogen atom, an alkyl group, said alkyl group optionally being substituted; or
taken together with the nitrogen atom to which they are bonded, $R_3$ and $R_4$ form an optionally substituted heterocycle;
when n=m=1,
independently from one another, $R_3$, $R_4$ and $R_5$ are chosen from the group consisting of a hydrogen atom, an alkyl group, a halogenoalkyl group, an alkenyl group, a cyclic alkenyl group, an aryl group, a heteroaryl group, and a heterocyclic group, said alkyl, alkenyl, aryl, heteroaryl, or heterocyclic groups optionally being substituted; or together with the carbon atom to which they are bonded, $R_3$, $R_4$ and $R_5$ form an optionally substituted aryl; or
together with the carbon atom to which they are bonded, $R_3$ and $R_4$ form an optionally substituted cyclic alkyl and $R_5$ is as defined above; or
together with the carbon atom to which they are bonded, $R_3$ and $R_4$ form an optionally substituted cyclic alkenyl and $R_5$ is as defined above; or
together with the carbon atom to which they are bonded, $R_3$, $R_4$ and $R_5$ form a cyclic alkenyl; and
Z is chosen from the group consisting of:
X or Y as defined below;
characterised in that a silylated formiate of formula (II)

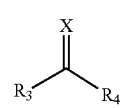

(II)

where $R_0$, $R_1$ and $R_2$ are as defined above;

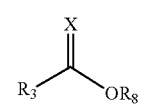

(V)

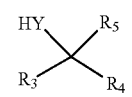

(VI)

(VIII)

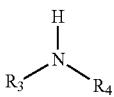
(IX)

where:
R$_3$, R$_4$, and R$_5$ are as defined above;
R$_8$ is chosen from the group consisting of a hydrogen atom, an alkyl group, an alkenyl group, an alkynyl group, an aryl group, a heteroaryl group, and a heterocyclic group, said alkyl, alkenyl, alkynyl, aryl, heteroaryl, or heterocyclic groups optionally being substituted;
X is an oxygen atom; and
Y is chosen from a group consisting of an oxygen atom or a sulphur atom;
in the presence of a catalyst and optionally of an additive.

2. The method according to claim 1, wherein, when n=0 and m=1,
the organic compound is of formula (IX); and
in the compound of formula (I), Z is NR$_3$R$_4$;
where, taken together with the nitrogen atom to which they are bonded, R$_3$ and R$_4$ form an optionally substituted heterocycle.

3. The method according to claim 1, wherein, when n=m=1,
the organic compound is of formula (V); and
in the compound of formula (I), Z is X and X represents an oxygen atom, where
R$_5$ is a hydrogen atom; and
independently from each other, R$_3$ and R$_4$ are chosen from the group consisting of a hydrogen atom, an alkyl group, a halogenoalkyl group, an alkenyl group, a cyclic alkenyl group, an aryl group, a heteroaryl group, and a heterocyclic group, said alkyl, alkenyl, aryl, heteroaryl, or heterocyclic groups optionally being substituted.

4. The method according to claim 1, wherein, when n=m=1,
the organic compound is of formula (V); and
in the compound of formula (I), Z is X and X represents an oxygen atom, where
R$_5$ is a hydrogen atom; and
together with the carbon atom to which they are bonded, R$_3$ and R$_4$ form a cyclic alkyl containing 3 to 20 carbon atoms, said cyclic alkyl optionally being substituted.

5. The method according to claim 1, wherein, when n=m=1,
the organic compound is of formula (VI); and
in the compound of formula (I), Z is X and X represents an oxygen atom, where:
R$_8$ is chosen from the group consisting of a hydrogen atom, an alkyl group, an aryl group, said alkyl, or aryl, h groups optionally being substituted; and
R$_3$ is chosen from the group consisting of a hydrogen atom, a hydroxyl group, an alkyl group, a halogenoalkyl group, an alkenyl group, an aryl group, a heteroaryl group, and a heterocyclic group, said alkyl, alkenyl, aryl, heteroaryl, or heterocyclic groups optionally being substituted; and
independently from each other, R$_4$ and R$_5$ represent a hydrogen atom.

6. The method according to claim 1, wherein, when n=m=1,
the organic compound is of formula (VIII); and
in the compound of formula (I), Z is Y, and Y represents an oxygen atom, and, independently from each other, R$_3$, R$_4$, and R$_5$ are chosen from the group consisting of:
a hydrogen atom;
an alkyl group containing 1 to 12 carbon atoms and their branched isomers, said alkyl group optionally being substituted with:
one or more hydroxy groups;
one or more alkoxy groups in which the alkyl radical contains 1 to 12 carbon atoms and the branched isomers thereof;
one or more alkenyl groups that contain 2 to 16 carbon atoms and their branched isomers, said alkenyl groups optionally being substituted with an alkyl group chosen from the group consisting of ethyl, propyl, butyl, pentyl, and the branched isomers thereof;
one or more halogenoalkyl groups chosen from the group consisting of —CF$_3$, —CCl$_3$, —CHCl$_2$, and —CClBrCF$_3$;
one or more siloxy groups chosen from the group consisting of trimethylsiloxy, triethylsiloxy, and butyldiphenylsiloxy; or
one or more aryl groups that contain 6 to 10 carbon atoms and that are optionally substituted with:
one or more halogen atoms chosen from the group consisting of fluorine, chlorine, bromine, and iodine atoms;
one or more alkoxy groups chosen from the group consisting of methoxy, ethoxy, propyloxy, butyloxy, pentyloxy, and the branched isomers thereof;
one or more alkyl groups chosen from the group consisting of methyl, ethyl, propyl, butyl, pentyl, hexyl, heptyl, and the branched isomers thereof;
one or more —C(O)R$_{13}$ acyl groups, where R$_{13}$ represents an alkyl group that contains 1 to 12 carbon atoms and the branched isomers thereof, an aryl group chosen from the group consisting of phenyl, and benzyl, an amino group chosen from the group consisting of dimethylamino, and diethylamino, an alkoxy group chosen from the group consisting of methoxy, and ethoxy, or an aryloxy group chosen from the group consisting of benzyloxy, and phenoxy;
one or more —OC(O)R$_{14}$ carboxyl groups, where R$_{14}$ represents a hydrogen atom, an alkyl group chosen from the group consisting of methyl, ethyl, propyl, butyl, pentyl, hexyl, heptyl, and their branched isomers, or an aryl group chosen from the group consisting of phenyl and benzyl;
one or more nitrile groups (—CN);
one or more nitro groups (—NO$_2$); or
one or more amino groups chosen from the group consisting of
—NH$_2$, —NHCH$_3$, —N(CH$_3$)$_2$, —N(CH$_2$CH$_3$)$_2$, and —NH(CH$_2$CH$_3$);
an alkenyl group that contains 2 to 16 carbon atoms and the branched isomers thereof, said alkenyl groups optionally being substituted with:
one or more alkyl groups chosen from the group consisting of methyl, ethyl, propyl, butyl, pentyl, hexyl, heptyl, and the branched isomers thereof;

one or more aryl groups chosen from the group consisting of phenyl, and benzyl, optionally substituted with:
  one or more halogen atoms chosen from the group consisting of fluorine, chlorine, bromine, and iodine atoms;
  one or more alkoxy groups chosen from the group consisting of methoxy, ethoxy, propyloxy, butyloxy, pentyloxy, and the branched isomers thereof;
  one or more alkyl groups chosen from the group consisting of methyl, ethyl, propyl, butyl, pentyl, hexyl, heptyl, and the branched isomers thereof;
  one or more thioalkoxy groups (—S-alkyl) with the alkyl radical being chosen from the group consisting of methyl, ethyl, propyl, butyl, pentyl, hexyl, heptyl, and the branched isomers thereof;
  one or more —C(O)$R_{13}$ acyl groups, where $R_{13}$ represents an alkyl group that contains 1 to 12 carbon atoms and the branched isomers thereof, an aryl group chosen from the group consisting of phenyl, and benzyl, an amino group chosen from the group consisting of dimethylamino, and diethylamino, an alkoxy group chosen from the group consisting of methoxy, and ethoxy, or an aryloxy group chosen from the group consisting of benzyloxy, and phenoxy;
  one or more —OC(O)$R_{14}$ carboxyl groups, where $R_{14}$ represents a hydrogen atom, an alkyl group chosen from the group consisting of methyl, ethyl, propyl, butyl, pentyl, hexyl, heptyl, and the branched isomers thereof, or an aryl group chosen from the group consisting of phenyl and benzyl;
  one or more nitrile groups (—CN);
  one or more nitro groups (—$NO_2$); or
  one or more amino groups chosen from
the group consisting of
—$NH_2$, —$NHCH_3$, —$N(CH_3)_2$, —$N(CH_2CH_3)_2$, and —$NH(CH_2CH_3)$;
a —C(O)$R_{13}$ acyl group, where $R_{13}$ is an alkyl group that contains 1 to 12 carbon atoms and the branched isomers thereof;
an aryloxy group in which the aryl radical contains 6 to 10 carbon atoms;
a halogenoalkyl group chosen from the group consisting of —$CF_3$, —$CCl_3$, —$CHCl_2$, and —$CClBrCF_3$;
an aryl group that contains 6 to 10 carbon atoms optionally substituted with:
  one or more halogen atoms chosen from the group consisting of fluorine, chlorine, bromine, and iodine atoms;
  one or more alkoxy groups chosen from the group consisting of methoxy, ethoxy, propyloxy, butyloxy, pentyloxy, and the branched isomers thereof;
  one or more alkyl groups chosen from the group consisting of methyl, ethyl, propyl, butyl, pentyl, hexyl, heptyl, and the branched isomers thereof;
  one or more thioalkoxy groups (—S-alkyl) with the alkyl radical being chosen from the group consisting of methyl, ethyl, propyl, butyl, pentyl, hexyl, heptyl, and the branched isomers thereof;
  one or more —C(O)$R_{13}$ acyl groups, where $R_{13}$ represents an alkyl group that contains 1 to 12 carbon atoms and the branched isomers thereof;
  one or more —OC(O)$R_{14}$ carboxyl groups, where $R_{14}$ represents a hydrogen atom, or an alkyl group chosen from the group consisting of methyl, ethyl, propyl, butyl, pentyl, hexyl, heptyl, and the branched isomers thereof;
  one or more nitrile groups (—CN);
  one or more nitro groups (—$NO_2$); or
  one or more amino groups chosen from the group consisting of
—$NH_2$, —$NHCH_3$, —$N(CH_3)_2$, —$N(CH_2CH_3)_2$, and —$NH(CH_2CH_3)$; and
a heteroaryl group that contains 5 to 12 members including at least 2 carbon atoms and at least one heteroatom chosen from nitrogen, oxygen, and sulphur.

7. The method according to claim 1, wherein, when n=m=1,
the organic compound is of formula (VIII); and
in the compound of formula (I), Z is Y, and Y represents an oxygen atom, and, together with the carbon atom to which they are bonded, $R_3$, $R_4$ and $R_5$ form an aryl that contains 6 to 10 carbon atoms, optionally substituted with:
  one or more halogen atoms chosen from the group consisting of fluorine, chlorine, bromine, and iodine atoms;
  one or more alkoxy groups chosen from the group consisting of methoxy, ethoxy, propyloxy, butyloxy, pentyloxy, and the branched isomers thereof;
  one or more aryloxy groups chosen from phenoxy and benzyloxy;
  one or more alkyl groups chosen from the group consisting of methyl, ethyl, propyl, butyl, pentyl, hexyl, heptyl, and the branched isomers thereof;
  one or more thioalkoxy groups (—S-alkyl) with the alkyl radical being chosen from the group consisting of methyl, ethyl, propyl, butyl, pentyl, hexyl, heptyl, and the branched isomers thereof;
  one or more —C(O)$R_{13}$ acyl groups, where $R_{13}$ represents an alkyl group that contains 1 to 12 carbon atoms and the branched isomers thereof, an aryl group chosen from the group consisting of phenyl, and benzyl, an amino group chosen from the group consisting of dimethylamino, and diethylamino, an alkoxy group chosen from the group consisting of methoxy, and ethoxy, or an aryloxy group chosen from the group consisting of benzyloxy, and phenoxy;
  one or more —OC(O)$R_{14}$ carboxyl groups, where $R_{14}$ represents a hydrogen atom, or an alkyl group chosen from the group consisting of methyl, ethyl, propyl, butyl, pentyl, hexyl, heptyl, and the branched isomers thereof;
  one or more nitrile groups (—CN);
  one or more nitro groups (—$NO_2$); or
  one or more amino groups chosen from the group consisting of
—$NH_2$, —$NHCH_3$, —$N(CH_3)_2$, —$N(CH_2CH_3)_2$, and —$NH(CH_2CH_3)$.

8. The method according to claim 1, wherein, when n=m=1,
the organic compound is of formula (VIII); and
in the compound of formula (I), Z is Y and Y represents an oxygen atom, where:

$R_5$ represents a hydrogen atom; and together with the carbon atom to which they are bonded, $R_3$ and $R_4$ form a monocyclic or polycyclic alkyl that contains 3 to 20 carbon atoms, said monocyclic or polycyclic alkyl group optionally being substituted with:
one or more hydroxy groups;
one or more alkoxy groups in which the alkyl radical contains 1 to carbon atoms and the branched isomers thereof;
one or more alkenyl groups that contain 2 to 16 carbon atoms and the branched isomers thereof, said alkenyl groups optionally being substituted with an alkyl group chosen from the group consisting of ethyl, propyl, butyl, pentyl, and the branched isomers thereof;
one or more halogenoalkyl groups chosen from the group consisting of —$CF_3$, —$CCl_3$, —$CHCl_2$, and —$CClBrCF_3$;
one or more siloxy groups chosen from the group consisting of trimethylsiloxy, triethylsiloxy, and butyldiphenylsiloxy; or
one or more aryl groups that contain 6 to 10 carbon atoms.

9. The method according to claim 1, wherein, when n=m=1,
the organic compound is of formula (VIII); and
in the compound of formula (I), Z is Y and Y represents an oxygen atom, where:
$R_5$ represents a hydrogen atom; and
together with the carbon atom to which they are bonded, $R_3$ and $R_4$ form a cyclic alkenyl that contains 3 to 20 carbon atoms and at least one double bond; or
together with the carbon atom to which they are bonded, $R_3$ $R_4$, and $R_5$ form a cyclic alkenyl that contains 3 to 20 carbon atoms and at least one double bond;
said cyclic alkenyl group optionally being substituted with:
one or more halogen atoms chosen from the group consisting of fluorine, chlorine, bromine, and iodine atoms;
one or more alkoxy groups chosen from the group consisting of methoxy, ethoxy, propyloxy, butyloxy, pentyloxy, and the branched isomers thereof;
one or more aryloxy groups chosen from between phenoxy and benzyloxy;
one or more alkyl groups chosen from the group consisting of methyl, ethyl, propyl, butyl, pentyl, hexyl, heptyl, and the branched isomers thereof;
one or more thioalkoxy groups (—S-alkyl) with the alkyl radical being chosen from the group consisting of methyl, ethyl, propyl, butyl, pentyl, hexyl, heptyl, and the branched isomers thereof;
one or more —$C(O)R_{13}$ acyl groups, where $R_{13}$ represents an alkyl group that contains 1 to 12 carbon atoms and the branched isomers thereof;
one or more —$OC(O)R_{14}$ carboxyl groups, where $R_{14}$ represents a hydrogen atom, or an alkyl group chosen from the group consisting of methyl, ethyl, propyl, butyl, pentyl, hexyl, heptyl, and the branched isomers thereof;
one or more nitrile groups (—CN);
one or more nitro groups (—$NO_2$); or
one or more amino groups chosen from the group consisting of —$NH_2$, —$NHCH_3$, —$N(CH_3)_2$, —$N(CH_2CH_3)_2$, and —$NH(CH_2CH_3)$.

10. The method according to claim 1, wherein, when n=m=1,
the organic compound is of formula (VIII); and
in the compound of formula (I), Z is Y, and Y represents a sulphur atom, and, together with the carbon atom to which they are bonded, $R_3$, $R_4$ and $R_5$ form an aryl that contains 6 to 10 carbon atoms, optionally substituted with:
one or more halogen atoms chosen from the group consisting of fluorine, chlorine, bromine, and iodine atoms;
one or more alkoxy groups chosen from the group consisting of methoxy, ethoxy, propyloxy, butyloxy, pentyloxy, and the branched isomers thereof;
one or more aryloxy groups chosen from between phenoxy and benzyloxy;
one or more alkyl groups chosen from the group consisting of methyl, ethyl, propyl, butyl, pentyl, hexyl, heptyl, and the branched isomers thereof;
one or more thioalkoxy groups (—S-alkyl) with the alkyl radical being chosen from the group consisting of methyl, ethyl, propyl, butyl, pentyl, hexyl, heptyl, and the branched isomers thereof;
one or more —$C(O)R_{13}$ acyl groups, where $R_{13}$ represents an alkyl group that contains 1 to 12 carbon atoms and the branched isomers thereof;
one or more —$OC(O)R_{14}$ carboxyl groups, where $R_{14}$ represents a hydrogen atom, or an alkyl group chosen from the group consisting of methyl, ethyl, propyl, butyl, pentyl, hexyl, heptyl, and the branched isomers thereof;
one or more nitrile groups (—CN);
one or more nitro groups (—$NO_2$); or
one or more amino groups chosen from the group consisting of —$NH_2$, —$NHCH_3$, —$N(CH_3)_2$, —$N(CH_2CH_3)_2$, and —$NH(CH_2CH_3)$.

11. The method according to claim 1, wherein, in the compound of formula (I) and the silylated formiate of formula (II),
independently of one another, $R_0$, $R_1$ and $R_2$ are chosen from the group consisting of an alkoxy group containing 1 to 12 carbon atoms, an alkyl group containing 1 to 20 carbon atoms, an aryl group containing 6 to carbon atoms, or an aryloxy group containing 6 to carbon atoms, said alkyl, aryl, alkoxy, and aryloxy groups optionally being substituted.

12. The method according to claim 1, wherein it takes place in the presence of a catalyst chosen from the group consisting of metallic salts or metallic complexes of:
alkaline earth metals chosen from the group consisting of $MgSO_4$, $MgCl_2$, $Mg(OAc)_2$, $Ca(BF_4)_2 \cdot xH_2O$, $CaCl_2$, and $Ca(OAc)_2$; and
transition metals chosen from the group consisting of $Fe(BF_4)_2O_6H_2O$, $Fe(acac)_3$, $Fe(OAc)_2$, $FeCl_2$, $FeBr_2$, $Cu(OTf)_2$, $Cu(OAc)_2H_2O$, $Zn(OAc)_2$, $Zn(BDI)Et$, $ZnEt_2$, $RuCl_3 \cdot nH_2O$, $Ru(COD)(Methylallyl)_2$, $[Ru(p\text{-}cymene)Cl_2]_2$, $[Ru(\kappa^1\text{-}OAc)(\kappa^2\text{-}OAc)(\kappa^3\text{-}triphos)]$, $Ru(dmso)_4Cl_2$, $Rh_2(OOCCH_3)_4$, $Rh(acac)_3$, $[Rh(COD)Cl]_2$, $Pd(OAc)_2$, $Pd(PPh_3)_4$, $NiCl_2$, $Ni(COD)_2$, $Ni(PPh_3)_2Cl_2$, $PtCl_2$, $PtCl_4$, $Pt(COD)(Me)_2$, and $Pt(NH_3)_2Cl_2$.

13. The method according to claim 1, wherein it takes place in the presence of an additive chosen from:
triadamantylephosphine (PAdm$_3$), tris[2-diphenylephosphino)ethyl]phosphine (PP$_3$), 1,1,1-tris(diphenylphosphinomethyl)ethane (triphos), 1,3-Bis(2,6-diisopropylphenyl)imidazol-2-ylidene (IPr), tricyclohexylphosphine, acetate (AcO), acetylacetonate (acac), 1,2-bis-diphenylphosphinoethane (dppe), N,N,N',N'-tetra-methyl-ethylenediamine (TMEDA), N,N'-bis(2,6-diisopropylphenyl) B-dicetiminate (BDI), 1,2-bis(diphenylphosphino)ethane (dppb), or pyridine;

trifluoromethanesulfonic acid (TfOH), trifluoroacetic acid (TFA), or bis(trifluoromethane)sulfonamide (HNTf$_2$);

boron trifluoride (BF$_3$), tris(pentafluorophenyl)borane (B(C$_6$F$_5$)$_3$), or aluminium trichloride (AlCl$_3$);

triethylamine, potassium Cert-butoxide (tBuOK);

lithium chloride (LiCI), sodium chloride (NaCl), or potassium chloride (KCl); and carbenes chosen from the group consisting of salts of 1,3-bis(2,6-diisopropylphenyl)-1H-imidazol-3-ium (IPr), 1,3-bis(2,6-diisopropylphenyl)-4,5-dihydro-1H-imidazol-3-ium (s-IPr), 1,3-bis(2,4,6-trimethylphenyl)-1H-imidazol-3-ium (IMes), 1,3-bis(2,4,6-trimethylphenyl)-4,5-dihydro-1H-imidazol-3-ium (s-IMes), 4,5-dichloro-1,3-bis(2,6-diisopropylphenyl)-1H-imidazol-3-ium (Cl$_2$—IPr), 1,3-di-tert-butyl-1H-imidazol-3-ium (ItBu), and 1,3-di-tert-butyl-4,5-dihydro-1H-imidazol-3-ium (s-ItBu), said salts being in the form of chloride salts or tetraphenylborate salts.

14. The method according to claim 1, wherein the quantity of the organic compound of formula (V), (VI), (VIII) or (IX) is 0.1 to 1 molar equivalent relative to the silylated formiate of formula (II).

15. The method according to claim 1, wherein the quantity of catalyst is 0.0001 to 0.2 molar equivalent relative to the organic compound of formula (V), (VI), (VIII) or (IX).

16. The method according to claim 1, wherein the quantity of the additive is 0.001 to 2 molar equivalents relative to the organic compound of formula (V), (VI), (VIII) or (IX).

* * * * *